US012222112B2

(12) United States Patent
Konowalczyk

(10) Patent No.: US 12,222,112 B2
(45) Date of Patent: Feb. 11, 2025

(54) METHODS OF CONFIGURING AND CONTROLLING HOT WATER SUPPLY INSTALLATIONS

(71) Applicant: OCTOPUS ENERGY HEATING LIMITED, London (GB)

(72) Inventor: Peter Konowalczyk, London (GB)

(73) Assignee: Octopus Energy Heating Limited, London (GB)

( * ) Notice: Subject to any disclaimer, the term of this patent is extended or adjusted under 35 U.S.C. 154(b) by 0 days.

(21) Appl. No.: 18/275,518

(22) PCT Filed: Feb. 7, 2022

(86) PCT No.: PCT/IB2022/051057
§ 371 (c)(1),
(2) Date: Aug. 2, 2023

(87) PCT Pub. No.: WO2022/168029
PCT Pub. Date: Aug. 11, 2022

(65) Prior Publication Data
US 2024/0310057 A1 Sep. 19, 2024

(30) Foreign Application Priority Data

Feb. 7, 2021 (GB) ...................................... 2101678
Jul. 2, 2021 (GB) ...................................... 2109593
(Continued)

(51) Int. Cl.
F24D 19/10 (2006.01)
F24D 17/00 (2022.01)

(52) U.S. Cl.
CPC ..... F24D 17/0073 (2013.01); F24D 17/0068 (2013.01); F24D 19/1054 (2013.01);
(Continued)

(58) Field of Classification Search
CPC ............. F24D 17/0073; F24D 19/1054; F24D 19/1006; F24D 19/1051; F24D 2200/08
See application file for complete search history.

(56) References Cited

U.S. PATENT DOCUMENTS 4,798,059 A 1/1989 Morita
10,139,135 B1 * 11/2018 Lesage .................. F24H 9/2007
(Continued)

FOREIGN PATENT DOCUMENTS

AT 504285 A1 4/2008
CN 201191144 Y 2/2009
(Continued)

OTHER PUBLICATIONS

International Search Report for International Application No. PCT/IB2022/051057, dated May 24, 2022 (3 pages).
(Continued)

*Primary Examiner* — Ko-Wei Lin
(74) *Attorney, Agent, or Firm* — Hartman Global IP Law; Gary M. Hartman; Domenica N. S. Hartman

(57) ABSTRACT

Provided is a method of disinfecting a hot water supply system having a plurality of controllable hot-water outlets and a water heating arrangement including an energy store comprising a phase change material that has a phase transition temperature of less than 60 Celsius, the method comprising: informing an operator of a future disinfection event; increasing a hot water supply temperature from a pre-event temperature of less than 60 Celsius to a disinfection temperature; providing a signal to the operator to cause the operator to open a first of the hot water outlets; providing a signal to the operator to close the first outlet after a disinfection period; providing a signal to the operator to open another hot water outlet; providing a signal to the operator to close the another hot water outlet after a disinfection period; and repeating the signalling to the operator to
(Continued)

open and then, after a disinfection period, to close each of the plurality of controllable hot-water outlets; reducing the hot water supply temperature to the pre-event temperature of less than 60 Celsius from the disinfection temperature; and indicating to the operator the completion of the disinfection event. A corresponding hot water supply system is also provided, the system preferably including a heat pump.

19 Claims, 6 Drawing Sheets

(30) Foreign Application Priority Data

| Jul. 2, 2021 | (GB) | 2109594 |
|---|---|---|
| Jul. 2, 2021 | (GB) | 2109596 |
| Jul. 2, 2021 | (GB) | 2109597 |
| Jul. 2, 2021 | (GB) | 2109598 |
| Jul. 2, 2021 | (GB) | 2109599 |
| Jul. 2, 2021 | (GB) | 2109600 |
| Aug. 2, 2021 | (GB) | 2111085 |

(52) U.S. Cl.
CPC ...... *F24D 19/1057* (2013.01); *F24D 2200/08* (2013.01); *F24D 2200/12* (2013.01); *F24D 2200/14* (2013.01)

(56) References Cited

U.S. PATENT DOCUMENTS

| 2011/0271953 | A1 | 11/2011 | Wortmann et al. | |
|---|---|---|---|---|
| 2018/0038616 | A1 | 2/2018 | Scheers et al. | |
| 2019/0338962 | A1* | 11/2019 | Minnoy | F24D 17/02 |
| 2021/0010683 | A1* | 1/2021 | Bessette | G05D 7/0635 |
| 2021/0215352 | A1* | 7/2021 | Van Kerkhove | C02F 1/02 |
| 2021/0318027 | A1 | 10/2021 | Boros et al. | |
| 2024/0191908 | A1* | 6/2024 | Kimura | F24H 15/414 |

FOREIGN PATENT DOCUMENTS

| CN | 201265954 | Y | | 7/2009 | |
|---|---|---|---|---|---|
| CN | 203758014 | U | | 8/2014 | |
| CN | 104596114 | | | 5/2015 | |
| CN | 106110350 | | | 11/2016 | |
| CN | 111189348 | A | | 5/2020 | |
| CN | 111750528 | A | | 10/2020 | |
| CN | 111811142 | A | | 10/2020 | |
| DE | 3838046 | | | 5/1990 | |
| DE | 3838476 | | | 5/1990 | |
| DE | 29921889 | U1 | | 6/2000 | |
| DE | 10006564 | A1 | | 8/2000 | |
| DE | 10151253 | C1 | | 11/2002 | |
| DE | 102008043030 | A1 | | 4/2010 | |
| DE | 202012104942 | U1 | * | 3/2013 | ............... C02F 1/02 |
| DE | 102014225693 | A1 | | 6/2016 | |
| EP | 0007538 | A1 | | 2/1980 | |
| EP | 1684035 | A2 | | 7/2006 | |
| EP | 3173703 | | | 5/2017 | |
| GB | 2514179 | | | 11/2014 | |
| JP | S5795534 | A | | 6/1982 | |
| JP | S5812992 | A | | 1/1983 | |
| JP | H01256792 | A | | 10/1989 | |
| JP | H1144495 | A | | 2/1999 | |
| JP | 2004263912 | | | 9/2004 | |
| JP | 2005037078 | | | 2/2005 | |
| JP | 2012002469 | A | | 1/2012 | |
| KR | 20100030141 | A | | 3/2010 | |
| NL | 2001108 | | | 6/2009 | |
| WO | 2011058383 | | | 5/2011 | |
| WO | 2014202974 | | | 12/2014 | |
| WO | 2020209979 | A2 | | 10/2020 | |
| WO | 2022168029 | | | 8/2022 | |

OTHER PUBLICATIONS

Notice of Reasons for Refusal for Japanese Patent Application No. 2023-547562, dated Mar. 14, 2024 (English & Japanese Translation), 16 pages.
Chinese First Office Action dated Jun. 15, 2024, for Application Serial No. 202280023553.1, 9 pages (not translated).
Search Report for Application No. GB2109596.3, dated Aug. 10, 2021, 1 page.
Search Report for Application No. GB2109597.1, dated Aug. 10, 2021, 1 page.
Search Report for Application No. GB2109598.9, dated Aug. 10, 2021, 1 page.
Search Report for Application No. GB2109599.7, dated Aug. 10, 2021, 1 page.
Search Report for Application No. GB2109594.8, dated Aug. 12, 2021, 1 page.
Search Report for Application No. GB2109593.0, dated Aug. 20, 2021, 1 page.
Search Report for Application No. GB2109600.3, dated Aug. 20, 2021, 1 page.
Search Report for Application No. GB2111085.3, dated Sep. 14, 2021, 1 page.
Search Report for Application No. GB2215387.8, dated Jan. 16, 2023, 1 page.
Examination Report for Application No. GB2109599.7, dated Feb. 14, 2023, 2 pages.
Search Report for Application No. GB2300970.7, dated Feb. 20, 2023, 2 pages.
Search Report for Application No. GB2301929.2, dated Apr. 3, 2023, 1 page.
Search Report for Application No. GB2304349.0, dated Apr. 25, 2023, 1 page.

* cited by examiner

METHODS OF CONFIGURING AND CONTROLLING HOT WATER SUPPLY INSTALLATIONS

CROSS REFERENCE TO RELATED APPLICATIONS

This application claims the benefit of PCT/IB2022/051057 filed Feb. 7, 2022, having a priority claim to Great Britain Application Nos. GB 2101678.7 filed Feb. 7, 2021, GB 2109593.0 filed Jul. 2, 2021, GB 2109594.8 filed Jul. 2, 2021, GB 2109596.3 filed Jul. 2, 2021, GB 2109597.1 filed Jul. 2, 2021, GB 2109598.9 filed Jul. 2, 2021, GB 2109599.7 filed Jul. 2, 2021, GB 2109600.3 filed Jul. 2, 2021, and GB 2111085.3 filed Aug. 2, 2021. The contents of these prior patent documents are incorporated herein by reference.

TECHNICAL FIELD

The present disclosure variously relates generally to methods, systems and apparatus for use in helping consumers reduce their energy consumption for domestic hot water and space heating, and more particularly to methods of disinfecting a hot water supply system.

BACKGROUND

According to Directive 2012/27/EU buildings represent 40% of the final energy consumption and 36% of $CO_2$ emissions. The EU Commission report of 2016 "Mapping and analyses of the current and future (2020-2030) heating/cooling fuel deployment (fossil/renewables)" concluded that in EU households, heating and hot water alone account for 79% of total final energy use (192.5 Mtoe). The EU Commission also report that, "according to 2019 figures from Eurostat, approximately 75% of heating and cooling is still generated from fossil fuels while only 22% is generated from renewable energy. To fulfil the EU's climate and energy goals, the heating and cooling sector must sharply reduce its energy consumption and cut its use of fossil fuels. Heat pumps (with energy drawn from the air, the ground or water) have been identified as potentially significant contributors in addressing this problem.

In many countries, there are policies and pressures to reduce carbon footprint. For example, in the UK in 2020 the UK Government published a whitepaper on a Future Homes Standard, with proposals to reduce carbon emissions from new homes by 75 to 80% compared to existing levels by 2025. In addition, it was announced in early 2019 that there would be a ban on the fitment of gas boilers to new homes from 2025. It is reported that in the UK at the time of filing 78% of the total energy used for the heating of buildings comes from gas, while 12% comes from electricity.

The UK has a large number of small, 2-3 bedroom or less, properties with gas-fired central heating, and most of these properties use what are known as combination boilers, in which the boiler acts as an instantaneous hot water heater, and as a boiler for central heating. Combination boilers are popular because they combine a small form factor, provide a more or less immediate source of "unlimited" hot water (with 20 to 35 kW output), and do not require hot water storage. Such boilers can be purchased from reputable manufactures relatively inexpensively. The small form factor and the ability to do without a hot water storage tank mean that it is generally possible to accommodate such a boiler even in a small flat or house-often wall-mounted in the kitchen, and to install a new boiler with one man day's work.

It is therefore possible to get a new combi gas boiler installed inexpensively. With the imminent ban on new gas boilers, alternative heat sources will need to be provided in place of gas combi boilers. In addition, previously fitted combi boilers will eventually need to be replaced with some alternative.

Although heat pumps have been proposed as a potential solution to the need to reduce reliance on fossil fuels and cut $CO_2$ emissions, they are currently unsuited to the problem of replacing gas fired boilers in smaller domestic (and small commercial) premises or a number of technical, commercial and practical reasons. They are typically very large and need a substantial unit on the outside of the property. Thus they cannot easily be retro-fitted into a property with a typical combi boiler. A unit capable of providing equivalent output to a typical gas boiler would currently be expensive and may require significant electrical demand. Not only do the units themselves cost multiples of the equivalent gas fired equivalent, but also their size and complexity mean that installation is technically complex and therefore expensive. A further technical problem is that heat pumps tend to require a significant time to start producing heat in response to demand, perhaps 30 seconds for self-checking then some time to heat up-so a delay of 1 minute or more between asking for hot water and its delivery. For this reason, attempted renewable solutions using heat pumps and/or solar are typically applicable to large properties with room for a hot water storage tank (with space demands, heat loss and *legionella* risk).

There therefore exists a need to provide a solution to the problem of finding a suitable technology to replace gas combi boilers, particularly for smaller domestic dwellings.

More generally, further developments are sought for broadening the applicability of heat pumps. Aspects of the present disclosure provide solutions in respect of these long felt wants.

An important component of domestic energy consumption stems from use of domestic hot water, both in terms of the volume of hot water used, and in terms of energy wastage through overheating of domestic hot water. Hot water wastage is also, of course, a significant contributor to the more general problem of water wastage, which also needs to be addressed if mankind is going to have a sustainable future. Aspects of the present disclosure address these issues also.

Other concerns also arise from the efficient operating temperatures of heat pumps typically being less than 50 Celsius, with the consequent risk of *Legionella* infection of hot water supply systems.

SUMMARY

In a first aspect there is provided a method of disinfecting a hot water supply system having a plurality of controllable hot-water outlets and a water heating arrangement including an energy store comprising a phase change material that has a phase transition temperature of less than 60 Celsius, the method comprising: informing an operator of a future disinfection event; increasing a hot water supply temperature from a pre-event temperature of less than 60 Celsius to a disinfection temperature; providing a signal to the operator to cause the operator to open a first of the hot water outlets; providing a signal to the operator to close the first outlet after a disinfection period; providing a signal to the operator to open another hot water outlet; providing a signal to the operator to close the another hot water outlet after a disinfection period; and repeating the signalling to the operator to open and then, after a disinfection period, to close each of the plurality of controllable hot-water outlets; reducing the hot water supply temperature to the pre-event temperature of less than 60 Celsius from the disinfection temperature; and indicating to the operator the completion of the disinfection event.

Optionally the signals are provided to the operator by means of an app on a wireless transmission/reception unit such as a smart phone or tablet computing device.

Optionally, increasing hot water supply temperature from a pre-event temperature of less than 60 Celsius to a disinfection temperature comprises increasing a temperature of the phase change material in the energy store. Optionally, increasing the temperature of the phase change material in the energy store involves supplying heat from an electrical heating arrangement associated with the energy store. Optionally, increasing the temperature of the phase change material in the energy store involves supplying heat from a heat pump (optionally an air source heat pump) or from a solar water heating arrangement.

Increasing hot water supply temperature from a pre-event temperature of less than 60 Celsius to a disinfection temperature may comprise applying heat to water in a supply line intermediate the energy store and the plurality of controllable hot-water outlets, for example by means of an auxiliary water heater.

Optionally, the providing of signals to the operator is controlled so that the operator is guided to open the controllable hot-water outlets in sequence starting from the outlet that has the shortest flow path distance from the energy store. In this way it may be possible to achieve effective sterilisation of the whole of the hot water supply system while minimising the amount of hot water used in the disinfection event.

The water heated by the energy store may supplied to the plurality of controllable hot-water outlets by one or more branched supply lines, and the providing of signals to the operator may be controlled so that the operator is guided to open the controllable hot-water outlets in sequence along a supply line branch starting from the outlet on the branch that has the shortest flow path distance from the energy store.

The disinfection periods for the different outlets may be substantially the same.

Alternatively, the disinfection period for an outlet may be selected based, at least in part, on the flow path distance from the energy store to the outlet.

The method of the first aspect may further comprise scheduling a disinfection event. In this way it may be easier to accommodate a disinfection event while reducing the risk of scalding users of the hot water supply system. Optionally, the future disinfection event is a scheduled disinfection event that is scheduled to take place within a predetermined time, optionally within one hour, 45 minutes, 30 minutes, 20 minutes, 15 minutes, 10 minutes, or 5 minutes.

Preferably, the disinfection event is only performed on the condition that the operator indicates consent to the performance of the event. The consent of the operator may conveniently be provided by means of an app on a wireless transmission/reception unit.

The method of the first aspect may further comprise inferring which water outlet has provided a demand for heated water and setting a heating characteristic based on the outlet and inferred transit path to the outlet.

Preferably, the pre-event temperature of less than 60 Celsius is a hot water supply temperature regulated by a controller of the hot water supply system.

According to a second aspect there is provided a hot-water supply installation having a plurality of controllable hot-water outlets, the installation including:

a source of hot water with an outlet having a controllable outflow temperature, the source including an energy storage arrangement containing a mass of phase change material and a heat exchanger that is coupled between the hot-water supply installation and a heat pump or a solar water heating arrangement, and a system controller configured to perform the method of any variant of the first aspect.

Optionally, the energy storage arrangement may comprise an electrical heating arrangement coupled to the system controller.

Optionally, an additional heating arrangement is provided in the hot water flow path from the energy storage arrangement to the plurality of controllable hot-water outlets, the additional heating arrangement being coupled to the system controller.

The system controller may be configured to limit the temperature at which water is supplied from the outlet of the source of hot water to less than 60 Celsius except during disinfection events.

Preferably, the system controller is coupled to a radio frequency transceiver for signalling to a WTRU of an operator.

Optionally, the plurality of controllable hot-water outlets are coupled to a hot water supply loop. In this way it may be possible to reduce the amount of water wasted while waiting for hot water to run hot.

According to a third aspect there is provided a method of supplying heated water to a user from an appliance including a thermal energy store, a renewable heat source and a supplementary heat source, the method comprising:

in response to a demand for heated water, heating water to a first target temperature, preferably in the range 40-50 degrees Centigrade to provide heated water to a user, the method further comprising:

in response to detecting an elapsed period of time without substantial water usage, performing at least one of the following:—
  heating the water in a heat exchanger to a disinfection temperature preferably of at least 60C; and/or
  in response to a demand for heated water, initially heating the water leaving the appliance to a disinfection temperature preferably of at least 60C for a period of time estimated to be sufficient for a pulse of heated water to travel to the water outlet and thereafter reducing the temperature to the first target temperature.

The method according to the third aspect may comprise inferring which water outlet has provided a demand for heated water and setting the heating characteristic based on the outlet and inferred transit path to the outlet.

BRIEF DESCRIPTION OF THE DRAWINGS

Embodiments of various aspects of the disclosure will now be described by way of example only, with reference to the accompanying drawings, in which.

SPECIFIC DESCRIPTION

The energy efficiency (commonly referred to as the Coefficient of Performance, COP) of a heat pump is linked to the temperature provided at the heat pump's output, with efficiency falling as the output temperature increases. For this reason, where a heat pump is used to provide domestic hot water heating, the hot water temperature is typically set well below 50 Celsius, for example at or near 40 Celsius. Unfortunately, if a hot water supply system is run at less than 50 Celsius there is a risk of the installation becoming infected with *Legionella*-which may represent a significant health risk to people using the hot water supply system.

Many heat pump installations used to provide domestic hot water use a hot water storage tank to store water heated by the heat pump. In order to reduce the risk from *Legionella* it is known to provide a heating element at the bottom of the store of hot water, and to use this heater to heat the hot water in the store to a temperature of 60 Celsius for one hour every 24 hours.

Unfortunately, as previously mentioned if heat pumps are satisfactorily to replace gas combination boilers in smaller dwellings, they need to do so without requiring a hot water storage tank. For the sake of operational efficiency such installations will preferably operate with heat pumps working at less than 50 Celsius, and will hence require disinfection against *Legionella*. Aspects of the present disclosure provide methods and installations to address these apparently conflicting requirements.

Figure 1:
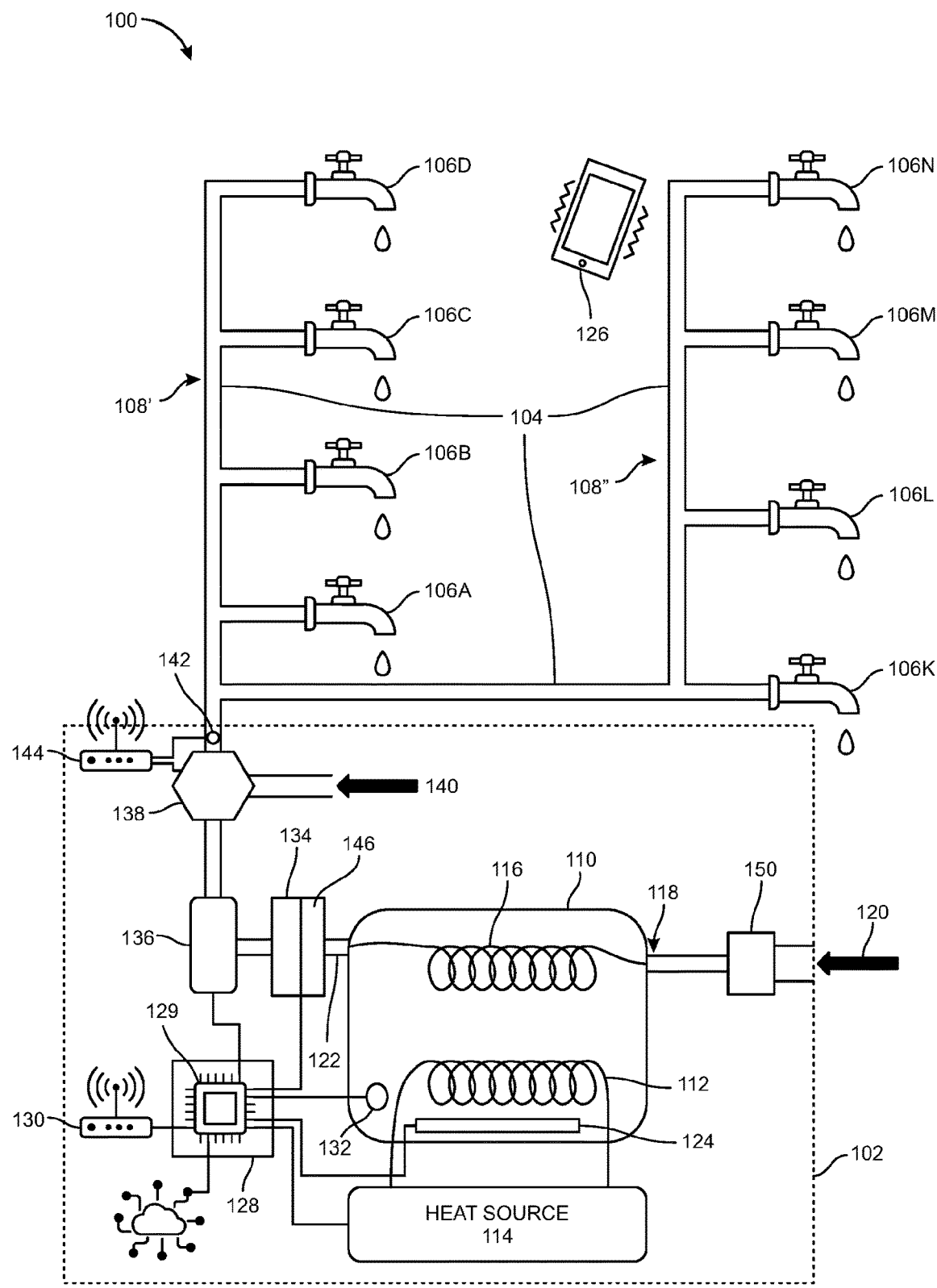
FIG. 1 illustrates schematically a hot water supply installation according to an aspect of the disclosure.

FIG. 1 illustrates schematically a hot water supply installation according to a first aspect of the disclosure and which is configured to facilitate disinfection of the hot water supply installation. The hot water supply system 100 comprises a heating appliance 102, and a distribution network 104 including a collection of controllable hot-water outlets 106 fed from the heating appliance 102 by a system of pipes 108. In the illustrated system, the distribution network 104 is shown as a trunk and branch arrangement of the type typically used in domestic hot water systems in the UK. The system of pipes includes a first branch 108', and a second branch 108". An example of a hot water supply system using a hot water circulation loop will be described later with reference to FIG. 2.

The heating appliance 102 comprises a thermal energy store 110 which includes an input-side heat exchanger 112, which is coupled to a heat source 114. The thermal energy store 110 also an output side heat exchanger 116 which is coupled between an input 118, which receives water from a water supply 120, and an output 122 that supplies the distribution network 104 with hot water. The thermal energy store 110 also includes a phase change material, not shown, to store energy as latent heat, and preferably also contains a heating element 124.

The heat source 114 is preferably a heat pump, such as an air source or ground source heat pump. Optionally however the heat source 114 may be a solar powered heat source. Heat from the heat source 114 heats the phase change material and thus also the output side heat exchanger 116, and the water therein. Typically, the heating liquid supplied from the heat source 114 is at a temperature significantly below 60 Celsius, and often the supplied temperature will be the range of 40 to 50 Celsius. The phase change material in the thermal energy store 110 has a phase transition temperature. The idea is that the heating liquid supplied from the heat source 114 arrives at a temperature above the phase transition temperature, so that the phase change material can store at least some of the supplied energy in the form of latent heat. Where the heating liquid supplied from the heat source 114 arrives at a temperature above the phase transition temperature, excess energy may be stored as sensible heat. Because heat pump efficiency increases with lower heating liquid temperature, typically the system will be designed so that the heating liquid is generally supplied at a temperature between 40 and 50 Celsius, the phase change material having a phase transition temperature within this range. This means that water passing through the output side heat exchanger 116 will also be heated to a temperature in this range, unless the phase change material has been further heated by the additional heating element 124. Typically, this additional heating element 124 will be electrically powered, and for optimum energy efficiency, and to reduce reliance on fossil fuels, as little reliance as will be placed on heating from this additional heating element 124 as possible.

It will be appreciated that in the absence of further heating, water in the distribution network 104 will be at a temperature lower, and probably considerably lower, then 50° C., with consequent risk of *Legionella* infection. In order to address that problem, we have devised a method of disinfecting the hot water supply system in which a hot water supply temperature is increased from a pre-event temperature of less than 60° C. to a disinfection temperature. A signal is provided to an operator, for example by signalling to a mobile device 126 of the operator, to cause the operator to open a first of the hot water outlets 106. Another signal is subsequently provided to the operator to cause the operator to close the first outlet after a disinfection period. Further signal is provided the operator to open another hot water outlet, and again subsequently signal is provided to the operator to close the another hot water outlet after disinfection. In this process is repeated, by signalling to the operator to open and then, after disinfection time to close each of the plurality of controllable hot water outlets 106. The hot water supply temperature is then reduced to the pre-event temperature from the disinfection temperature. The operator is informed of the completion of the disinfection event.

The heating appliance 102 includes a controller 128 having a processor 129 which can communicate with wireless device 126 by means of wireless interface 130. Wireless interface 130 can use Bluetooth or Wi-Fi to communicate with wireless device 126, but may also be able to communicate using a mobile network connection, such as UMTS, 4G, or 5G. The controller 128 may also be connected to the Internet either through wireless interface 130, through a wired interface, or both.

The controller 128 is arranged to communicate with the heat source 114, to receive status updates and other information, and to provide commands and status requests, etc., to a controller of the heat source (e.g. a controller of a heat pump). The controller 128 is also coupled to one or more sensors 132 in the energy store 110 which provide information on the status of the energy store, so that the controller 128 can determine the amount of energy stored in the energy store, as latent heat and as sensible heat. Also connected to the controller 128 is a temperature sensor 134 to sense the temperature of water emerging from the outlet 122 of energy store 110. Also, in the flow path between the outlet 122 and the distribution network 104 are a supplementary heater 136, and then a mixing valve 138 which is also connected to a cold water feed 140. The outlet of the mixing valve 138 supplies the distribution network 104 and includes a temperature sensor 142. The supplementary heater 136, the mixing valve 138, and the temperature sensor 142 are all coupled to the controller 128 either through a wired interface or through a wireless interface represented by 144. Optionally a flow sensor 146 is also included in the flow path from outlet 1 to 2 to mixing valve 138, and coupled to the controller 128.

The heating appliance controller 128 of the hot water supply system 100 may be programmed to perform a disinfection cycle according to a regular schedule, for example once a week, or a certain number of times each month. Optionally the controller may be programmed to take account of a usage history of the heating appliance, and to adjust scheduled performances of the disinfection cycle based on the usage history. A designated user of the system is provided with an app on her mobile phone, or other portable device, 126. A suitable disinfection schedule is established between the controller 128 and the designated user, by means of the app or some other medium, such as an online dialogue in which the designated user uses a desktop or laptop computer. Because the disinfection process involves the generation and discharge of water at temperatures at which scalding may result from accidental exposure to the water, it is important to schedule disinfection events for times when other users are unlikely to need hot water, or when access to hot water outlets can be managed. For example, in households where there are children, and/or elderly or infirm occupants, disinfection events are preferably scheduled for when such occupants are asleep, or otherwise occupied, with no risk of inadvertent exposure to water at scalding temperatures.

When a disinfection event has been scheduled, the designated user is informed of the scheduled disinfection event a short while before the event is due to take place—for example, half an hour or 15 minutes before the scheduled start. The designated user may be informed by notification generated by the app, or by notification generated by the controller 128. Preferably the designated user is required to respond to the notification, to confirm that the scheduled disinfection event may safely be performed, prior to the scheduled start. In the absence of such confirmation, the system may be configured to abort or reschedule the scheduled event. The system may be configured to initiate a call to the designated user's mobile device 126 in the event that no response is received, within a predetermined interval, to the notification. An automated system may be provided to handle such calls, and preferably a safeguard in the form of a password or code may be required from the person answering the call before it is determined that it is safe to perform the disinfection event. Preferably, a further notification is provided shortly before the scheduled start time, again requiring a response from the designated user before the disinfection process begins.

Only after satisfactory completion of the notification and response process does the controller 128 starts to increase the hot water supply temperature from a pre-event temperature of less than 60° C. to the disinfection temperature. The controller 128 may increase the hot water supply temperature by causing the heat source 114 to increase its supply temperature from a pre-event temperature to the disinfection temperature. Alternatively, the controller 128 may activate the heating element 124 within the energy store to raise the temperature within the energy store to the disinfection temperature. Alternatively, the controller 128 may activate the supplementary heater 136, located between the outlet 122 of the energy store 110 and the mixing valve 138, to heat water supplied from the outlet 122 to the disinfection temperature. In any event, the controller 128 will control the mixer valve 138 so that the temperature determined by temperature sensor 142 is at the disinfection temperature or above. It will be appreciated that heating the contents of the energy store to the disinfection temperature ensures that water within the heat exchanger 116 is also heated to the disinfection temperature, whereas if only the supplementary heater 136 is used the water within heat exchanger 116 is not heated to the disinfection temperature.

Once the controller 128 determines that the hot water to be supplied to the distribution network 104 is hot enough (either through direct measurement or based on the amount of energy supplied—for example to the supplementary heater), the controller 128 signals to the mobile device 126 to instruct the designated user to open the first of the hot water outlets. In a branch distribution outlet as illustrated in FIG. 1 it is preferred for the first outlet opened to be one which is closer to, rather than further away from, the heating appliance 102. In this way in effect an initial length of the distribution network is sterilised, and the sterilised length increased with each subsequent flow event. For example, in the arrangement shown in FIG. 1, the designated user is preferably first asked to open outlet 106A, and then, in sequence, 106B, 106C, and 106D. Thereafter the second branch 108" is sterilised by first opening outlet 106K, then 106L, then when 106M, and finally 106N. In each case the controller 128 preferably uses a flow sensor, such as 146, to check that water is indeed being discharged from the hot water supply system. After a predetermined disinfection period, the controller 128 again signals to the designated operator to close the first opened outlet 106A and thereafter to open the second outlet 106B. The controller may send the signal to close the first outlet, and the signal to open the second outlet, in a single message, or they may be two separate messages. Again, the controller 128 monitors a signal from a flow sensor, such as flow sensor 146, to ensure that hot water is indeed being discharged. After a predetermined disinfection period, which may or may not be the same as the first predetermined disinfection period, the controller 128 again signals to the designated user to close the outlet and to move onto the next. Again, the message to close an outlet and the message to open the next outlet may be sent together, or separately. The signalling and the flow monitoring preferably continue until all the outlets of the hot water supply system have been opened for the requisite amount of time.

After completion of the disinfection event the controller 128 ceases to provide extra heating for water in the system, whether from heat source 114, heating element 124 or supplementary heater 136. The controller also thereafter controls the mixer valve 138 so that the temperature of water supplied to the distribution network 104, as measured by sensor 142, is once again at a non-scalding temperature, for example at the pre-event temperature. Also, after completion of the disinfection event, the controller 128 signals to the designated user completion of the disinfection event.

Figure 2:
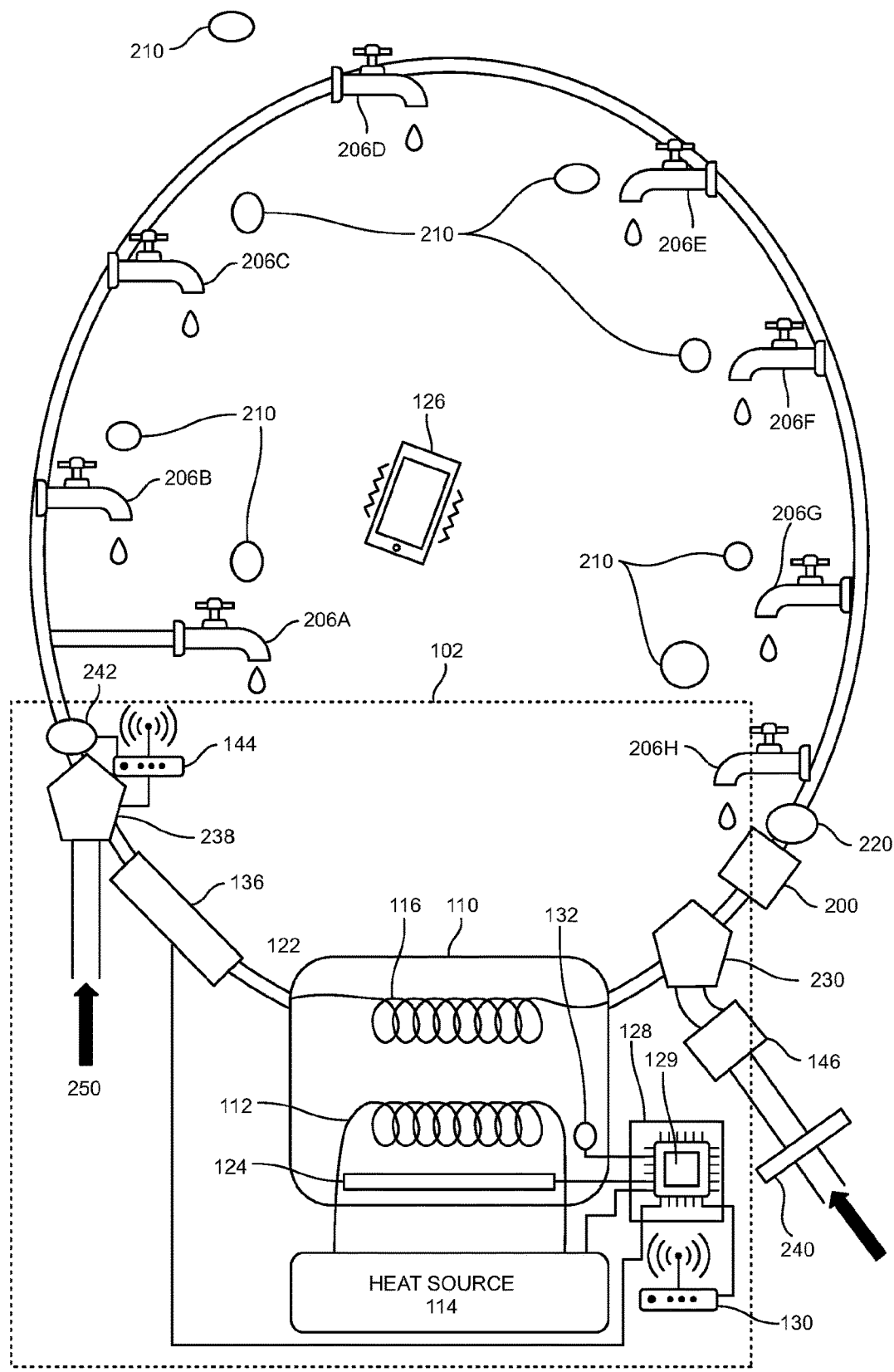
FIG. 2 illustrates schematically another hot water supply installation according to an aspect of the disclosure.

FIG. 2 corresponds closely to FIG. 1, but in this case the distribution network is in the form of a hot water circulation loop, rather than the more traditional trunk and branch arrangement illustrated in FIG. 1. A hot water circulation loop includes a pump 200 which is activatable by a control 210 provided at each of the water outlets 206. The pump 200 pumps water around the loop on receiving a demand from any of the control buttons 210. With such a system, rather than having to run a hot tap, wasting water, for many seconds before hot water reaches the tap that has been opened, the "cold water" that precedes the arrival of hot water is fed back into the heating appliance 102 where it is reheated. In this way, not only is the amount of water wasted reduced, but also energy usage may be reduced, in part because the "cold water" may be at a temperature considerably above that of the cold feed from the mains cold water supply. Typically, the pump 200 runs until a temperature sensor 220 at the end of the loop detects the arrival of hot water at a predetermined system supply temperature. For most installations this means that the pump will run for no more than about 20 to 45 seconds. The cold feed 120 for the hot water supply system is fed into the loop on the input side of the heating appliance 102 by means of a valve 230 which also receives the output from the pump 200. A nonreturn valve 240 is included in the cold-water feed to prevent the pump forcing water from the heating system back into the cold supply. The controller of the heating appliance may be connected to a flow sensor in the cold supply intermediate the non-return valve 240 and the valve 230 as with the installation shown in FIG. 1 supplementary heater 136 is provided just downstream of the energy store outlet 122. Another mixing valve 238, intermediate the supplementary heater 136 and a temperature sensor 242, is coupled to a cold feed 250, to enable the system controller 128 to adjust the temperature of the water supplied by the heating appliance 102.

Unlike with the trunk and branch distribution system of FIG. 1, with the hot water circulation loop the order in which the outlets are opened during the disinfection event is less important. Nevertheless, during a disinfection event it is still desirable to open the outlets in sequence around the loop. So for example the designated user may receive messages on the portable device 126 to first open outlet 206A, to run water for the disinfection period, to close outlet 206A, then to open 206B, etc. until finally outlet 206H is opened, water run for the disinfection period and then outlet 206H closed. As with the arrangement described with reference to FIG. 1, the controller 128 may heat to the disinfection temperature using either the heat source 114, the heating element 124, the supplementary heater 136, or some combination of these. The disinfection process may be performed with or without activating the pump 200, but in order to reduce the amount of water wasted it is preferred to activate the pump 200.

One of the many constraints on the applicability of heat pumps is their relatively limited ability to satisfy demand for hot water—at least when compared to instantaneous gas and electric water heaters, such as combi boilers, compared to their strengths as sources of heat for space heating. As noted earlier, for the typically modestly sized dwellings of the UK, space heating demands are commonly as low as 6 kW, whereas gas combi boilers even in modest one or two bed flats can typically provide 20 kW to 30 kW for instant water heating. The 6 kW space heating demand is readily achievable in Europe with even an air source heat pump, but a unit that could provide 20 to 30 kW would be unacceptably large and expensive. Heat pumps suffer from a further limitation in respect of their application to domestic hot water supplies, and that is the long lag between a heat pump receiving a start signal and hot water actually being supplied by the heat pump. Generally, this lag is well over a minute, and sometimes as much as two minutes or more. While that doesn't at first sight sound significant, when one realises that for things like handwashing-one of the most common uses of hot water in a domestic setting, the average time for which a hot tap runs is between 30 seconds and 1 minute-so it becomes clear that heat pumps have a significant hurdle to overcome. Typically, this problem is addressed by storing hot water-in a hot water storage tank, so that it is available on demand. But that solution is unattractive for smaller dwellings, such as the kinds of one, two and three bed properties in the UK that currently make use of gas combination boilers—and which are almost universally installed without an external hot water storage tank.

One technology which has potential to improve the applicability of heat pumps to the demands of, in particular, domestic hot demands, is thermal energy storage-but not in the guise of hot water storage.

Such an alternative form of thermal energy storage is the use of phase change materials (PCMs). As the name suggests, phase change materials are materials which exhibit a thermally induced phase change: heating the PCM to its phase transition temperature results in energy being stored as latent (rather than sensible) heat. Many different PCMs are known, the choice for any particular application being dictated by, among other things, the required operating temperature, cost constraints, health and safety restrictions (taking account of toxicity, reactivity, flammability, stability, etc. of the PCM, and the constraints that these impose on such as things as materials needed for containment of the PCM). With an appropriate choice of PCM, a thermal energy storage arrangement can be designed so that energy from a heat pump is available for instantaneous heating of water for a (domestic) hot water system, thereby helping address the slow start problem inherent with the use of a heat pump without the need for a bulky hot water tank.

We will now introduce and describe an energy storage arrangement based on the use of PCMs, and particularly suited for use in installations in which a heat pump is to be used to heat water in a hot water supply. Such an energy storage arrangement may include a heat exchanger comprising an enclosure, and within the enclosure: an input-side circuit for connection to an energy source such as a heat pump, an output-side circuit for connection to an energy sink such as a hot water supply installation, and a phase-change material for the storage of energy.

The input-side circuit receives liquid heated by the heat source, in our case a heat pump, and provided the liquid is hotter than the material inside the heat exchanger, energy is transferred from the liquid into the material within the heat exchanger. Likewise, energy from the material within the heat exchanger is transferred to liquid in the output-side circuit provided the liquid is cooler than the material within the heat exchanger. Of course, if there is no flow through the output-side circuit, the amount of energy transferred out of the heat exchanger is limited, so that most of the input energy remains within the heat exchanger. In our case, the heat exchanger contains a phase change material, for example, a paraffin wax or a salt-hydrate (examples of suitable materials are discussed later) so that the input energy is largely transferred to the PCM. With an appropriate choice of phase change material and heat pump operating temperature, it becomes possible to use energy from the heat pump to "charge" the energy "bank" represented by the PCM. Optionally, the energy supply from the heat pump may be supplemented by including one or more electrical heating elements in the heat exchanger, the heating elements being controlled by a processor of the system, and being used, for example, when a low-cost tariff applies to the electricity supply, or for example local or domestic electricity production such as from wind, hydraulic or photovoltaic generation, is able to provide "cheap" energy when there an anticipated or expected future need for hot water.

One characteristic of phase change materials which must be accommodated when designing systems that use them is the volume change which occurs on transition between phases, for example expansion on the phase change between solid and liquid, and contraction on the phase change between liquid and solid. Typically, the volume change is of the order of 10%. This volume change can be considered a disadvantage which must be accommodated with careful design of enclosures used to contain the phase change materials, but the volume change can also be used positively. By including one or more sensors to provide a measurement of pressure within the PCM enclosure it is possible to provide a processor with data from which the processor may determine an a status of the phase change material. For example, the processor may be able to determine an energy storage value for the phase change material.

In addition to, or as an alternative to, the measurement of pressure within the enclosure as a means of determining an energy storage amount of the phase change material, it is possible to use changes in the optical or sonic properties that occur in the PCM on changes of phase. Examples of these alternative approaches will be described later, but first we will consider the use of pressure sensing as a means to gather information on the energy storage state of the PCM.

Figure 3:
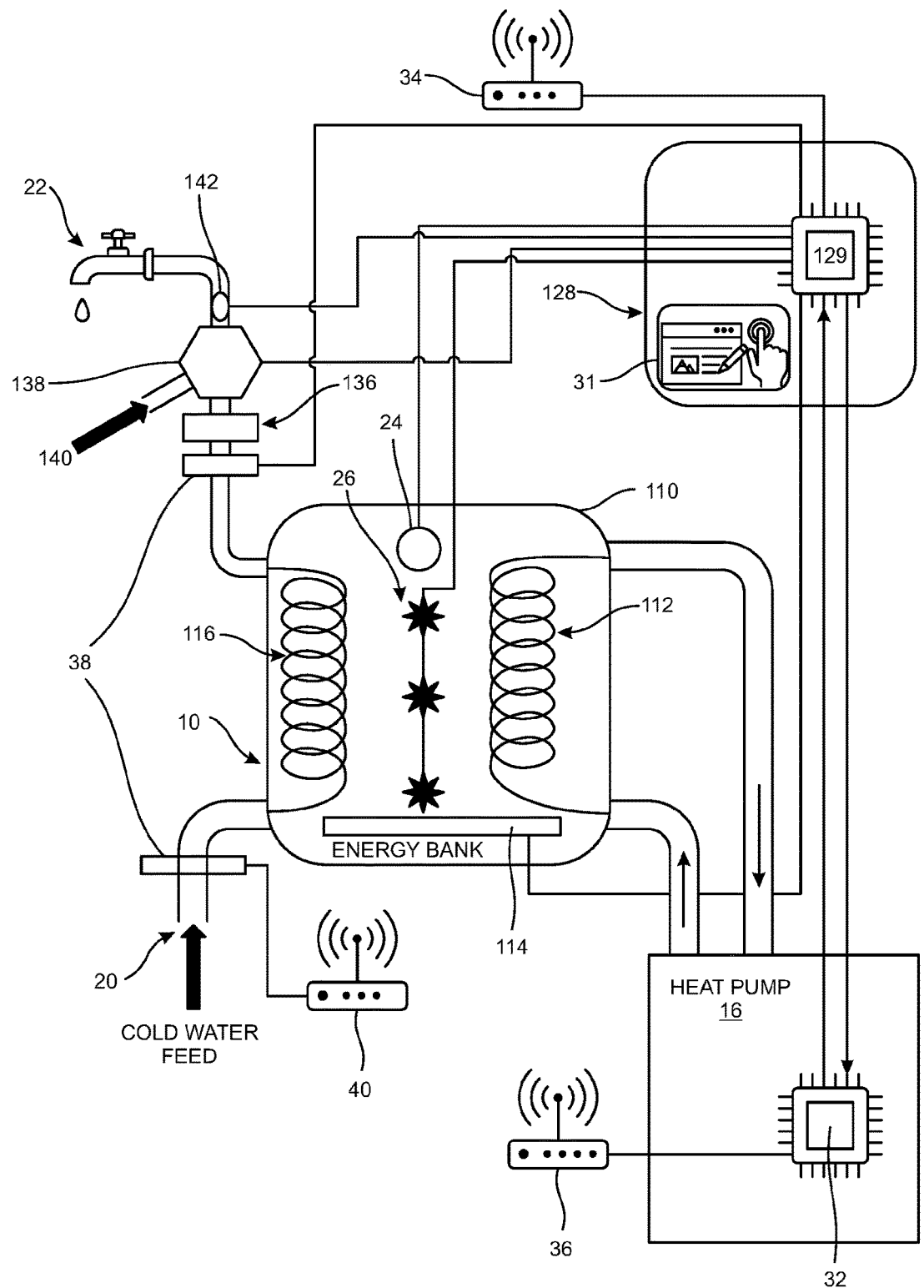
FIG. 3 is a schematic diagram showing an energy bank including a phase change material and a heat exchanger coupled to a heat pump energy source, the energy bank including one or more sensors to provide measurement data indicative of the amount of energy stored as latent heat in the phase change material.

FIG. 3 shows schematically an energy bank 10 including a heat exchanger, the energy bank comprising an enclosure 110. Within the enclosure 110 are an input-side circuit 112 of the heat exchanger for connection to an energy source-shown here as a heat pump 16, an output-side circuit 116 of the heat exchanger for connection to an energy sink-shown here as a hot water supply system connected to a cold-water feed 20 and including one or more outlets 22. Within the enclosure 12 is a phase-change material for the storage of energy. The energy bank 10 also includes one or more status sensors 24, to provide a measurement of indicative of a status of the PCM. For example, one or more of the status sensors 24 may be a pressure sensor to measure pressure within the enclosure. Preferably the enclosure also includes one or more temperature sensors 26 to measure temperatures within the phase change material (PCM). If, as is preferred, multiple temperature sensors are provided within the PCM, these are preferably spaced apart from the structure of the input and output circuits of the heat exchanger, and suitably spaced apart within the PCM to obtain a good "picture" of the state of the PCM.

The energy bank 10 has an associated system controller 128 which includes a processor 129. The controller may be integrated into the energy bank 10, but is more typically mounted separately. The controller 28 may also be provided with a user interface module 31, as an integrated or separate unit, or as a unit that may be detachably mounted to a body containing the controller 28. The user interface module 31 typically includes a display panel and keypad, for example in the form of a touch-sensitive display. The user interface module 31, if separate or separable from the controller 28 preferably includes a wireless communication capability to enable the processor 30 of controller 28 and the user interface module to communicate with each other. The user interface module 31 is used to display system status information, messages, advice and warnings to the user, and to receive user input and user commands-such as start and stop instructions, temperature settings, system overrides, etc.

The status sensor(s) is/are coupled to the processor 129 as is/are the temperature sensor(s) 26 if present. The processor 30 is also coupled to a processor/controller 32 in the heat pump 16, either through a wired connection, or wirelessly using associated transceivers 34 and 36, or through both a wired and a wireless connection. In this way, the system controller 28 is able to send instructions, such as a start instruction and a stop instruction, to the controller 32 of the heat pump 16. In the same way, the processor 30 is also able to receive information from the controller 32 of the heat pump 16, such as status updates, temperature information, etc.

The hot water supply installation also includes one or more flow sensors 38 which measure flow in the hot water supply system. As shown, such a flow sensor may be provided on the cold-water feed 20 to the system, and or between the output of the output-side circuit 18 of the heat exchanger. Optionally, one or more pressure sensors may also be included in the hot water supply system, and again the pressure sensor(s) may be provided upstream of the heat exchanger/energy bank, and/or downstream of the heat exchanger/energy bank—for example alongside one or more of the one or more flow sensors 38. The or each flow sensor, the or each temperature sensor, and the or each pressure sensor is coupled to the processor 30 of the system controller 28 with either or both of a wired or wireless connection, for example using one or more wireless transmitters or transceivers 40. Depending upon the nature(s) of the various sensors 24, 26, and 38, they may also be interrogatable by the processor 30 of the system controller 28.

Optionally, as shown, the energy bank 10 may include, within the enclosure 12, an electrical heating element 114 which is controlled by the processor 30 of the system controller 28, and which may on occasion be used as an alternative to the heat pump 16 to recharge the energy bank.

FIG. 3 is merely a schematic, and only shows connection of the heat pump to a hot water supply installation. It will be appreciated that in many parts of the world there is a need for space heating as well as hot water. Typically, therefore the heat pump 16 will also be used to provide space heating. An exemplary arrangement in which a heat pump both provides space heating and works with an energy bank for hot water heating will be described later in the application. For ease of description the following description of a method of operation of an energy bank according to an aspect of the invention, for example as illustrated in FIGS. 1 to 3, applies equally to the energy bank installation whether or not the associated heat pump provides space heating.

Figure 4:
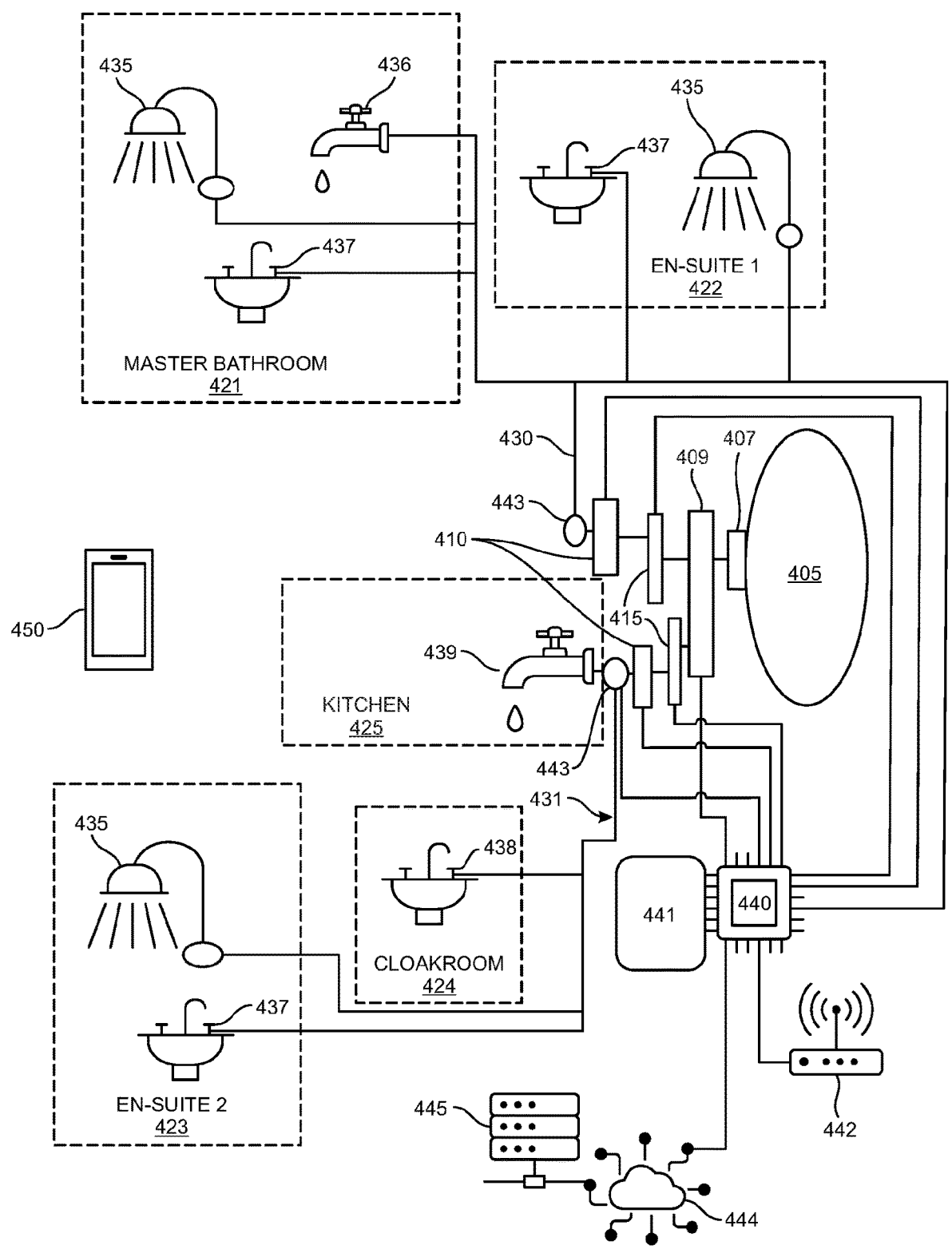
FIG. 4 is a schematic diagram showing an in-building water supply installation according to an aspect of the disclosure.

FIG. 4 shows schematically an in-building hot water supply installation 400, which corresponds generally to that illustrated in, and described with reference to, FIG. 1. The in-building hot water supply installation 400 has a plurality of controllable water outlets (various taps and showers that will be described more fully later), a supply of hot water 405 with at least one outlet 407 having a controllable outflow temperature, and in a water flow path between the supply of water 405 and the plurality of controllable water outlets, at least one first temperature sensor 409 to detect the outflow temperature, at least one flow measurement device 410 and at least one flow regulator 415. A processor 440 is operatively connected to the at least one flow measurement device 410 and the at least one flow regulator 415. The illustrated water supply installation represents a dwelling with a master bathroom 421, a first en-suite shower room 422, a second en-suite shower room 423, a cloakroom 424, and a kitchen 425. The master bathroom and the first en-suite shower room may be on one floor of the dwelling, whereas the cloakroom, second en-suite and kitchen may be on another floor of the dwelling. In such a situation, it may be convenient to have, as shown, two separate circuits, 430 and 431, to supply water to the various outlets. Although the two circuits 430 and 431 are shown as being supplied from a single outlet 407 from the hot water supply, with a single temperature sensor 409, it will be understood that the two circuits 430 and 431 may each be fed from a different outlet 407, the temperature of the two outlets 407 being separately adjustable, and each outlet 407 having its own associated temperature sensor 409. The temperature of the water at the outlet (s) 407 may be adjusted by mixing cold water with hot water from a source of fixed or variable temperature, or it may be adjusted by controlling the energy put into a heat source, such as an electric heating element or even a gas fired heater. Later we will describe hot water systems which include PCM energy storage arrangements, generally in combination with a heat pump, and in such systems generally the hot water supply temperature may be adjusted by mixing in different proportions of cold water from a cold-water supply. Sometimes such systems may include an instantaneous heat source (such as an electrical heating element) downstream of the PCM energy storage arrangement, controlled by a processor of the system, and in such installations control of hot water supply temperature may involve controlling the amount of energy supplied to the instantaneous water heater, as well possibly by mixing in different proportions of cold water from a cold-water supply.

The master bathroom 421 is shown as including a shower outlet 435, a bath tap or faucet 436, and a tap 437 for a sink. The en-suite shower rooms 422 and 423 also include a shower outlet 435, and a tap 437 for a sink. Conversely, the cloakroom contains just a W.C. (not shown) and a hand basin with a tap 438. Finally, the kitchen has a sink with a tap 439.

A processor, or system controller, 440, with an associated memory 441, is coupled to the at least one flow measurement device 410 and the at least one flow regulator 415. It will be appreciated that each of the two circuits 430 and 431 is provided with a respective flow measurement device 410 and flow regulator 415 The processor is also optionally connected to one or more temperature sensors 443, one for each of the circuits 430 and 431. This processor may be associated with an energy bank as previously described.

The processor may also be coupled to an RF transceiver 442, which includes at least one RF transmitter and at least one RF receiver, for bidirectional communication via Wi-Fi, Bluetooth, or the like, and preferably also to the Internet 444 for connection to a server or central station 445, and optionally to a cellular radio network (such as LTE, UMTS, 4G, 5G, etc.). By means of the RF transceiver 442 and/or the connection to the Internet, the processor 440 is able to communicate with a mobile device 450, which may for example be a smart phone or tablet, for use by an installation engineer in configuring (and also optionally in mapping) the in-building water supply installation. The mobile device 450 includes software, such as a specific app, that co-operates with corresponding software in the system controller 440 and also potentially within server 445, to facilitate the configuring (and optionally mapping) methods according to embodiments of the invention, and in particular to synchronize actions taken by the engineer to a clock of the system controller 440/server 445. The memory 441 contains code to enable the processor to perform a method of configuring (and optionally mapping) an in-building water supply installation processor, for example during a process of commissioning a new installation.

During the commissioning process, in order to configure the hot-water supply installation 400, the engineer may be asked to setup a temperature sensor direct under a particular hot-water outlet, e.g. a specific tap or shower outlet, and to open the outlet fully at a specific moment. The system processor is configured to measure flow, the difference between both outflow and provided temperature, time delay and, preferably, outdoor temperature (data provided from an external temperature sensor). This will allow algorithms (e.g. MLAs) to calculate heat loss through the distribution system, distance between the outlet (tap or shower outlet) and the source of hot water, and finally, accurately adjust the outflow temperature at 407 to achieve the correct water temperature at the relevant controllable outlet (e.g. tap). For example, if the household includes children, then the maximum hot water temperature to every outlet other than, for example, the kitchen sink may be limited to 40 C or 41 C, whereas if there are infants in the house, the maximum temperature may be limited to 37 C. Even in the absence of children, the maximum temperature for all outlets other than the kitchen sink may be set at 43 C, and possibly 41 C for shower outlets.

The system may also be set up to restrict the flow of hot water to some classes of water outlets, such as handbasins and sinks, and possibly showers, with different maximum flow rates being set for each class of outlet, and/or maximum specific flow rates may be set for specific outlets-so lower flow rates set for bathrooms and cloakrooms used by children, for example. The determination of maximum temperatures and flow rates may be based on rules provided by the system supplier. Later we will discuss hot water supply systems which use heat pumps and PCM-based energy storage arrangements, and such systems benefit significantly from the imposition of temperature and flow rate control-since heat pumps sized according to the space heating need of a modestly sized 1 to 3 bedroom dwelling generally do not have the heating capacity to satisfy the instantaneous hot water demands of the household, without the provision of voluminous hot water storage tanks. By managing hot water flow and temperature, it may be possible to eliminate the need to provide hot water storage, while minimizing the size of the energy shortfall to be accommodated by other means. If the installation does include a PCM energy storage arrangement and a heat pump, the system supplier will typically pre-program the processor with suitable values for temperature and flow based on outlet type and household composition.

A database of temperatures and optionally flow rates, based on outlet type and household composition may also be made available to the system controller over the internet, and updated from time to time. A user interface for the system controller may provide a means for occupiers and or service engineers to adjust the various settings according to changes in the household composition—for addition the arrival of guests with infants, children or elderly or infirm persons, of for example to allow users to set lower maximum temperatures and/or flow rates.

Figure 5:
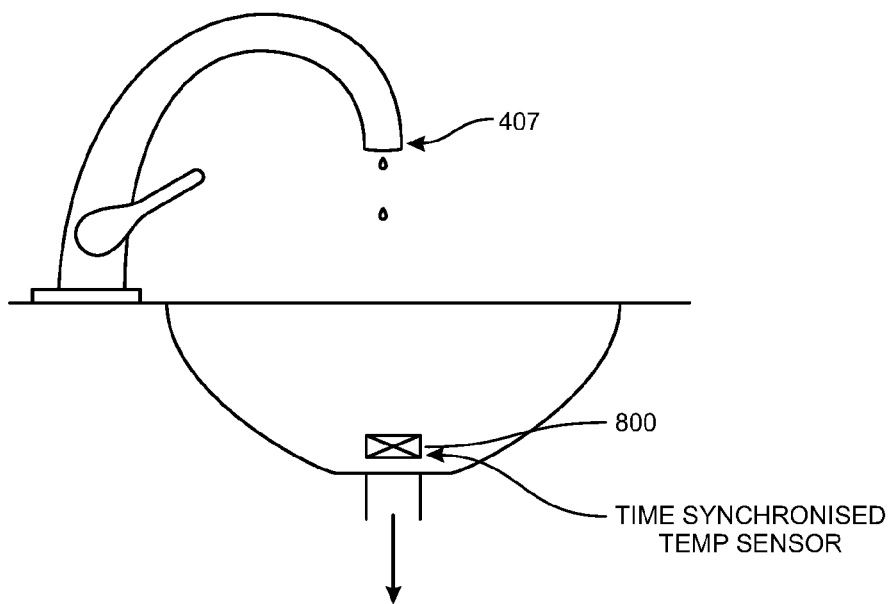
FIG. 5 illustrates schematically a method of configuring a hot-water supply installation having a plurality of controllable hot-water outlets.
Figure 5:
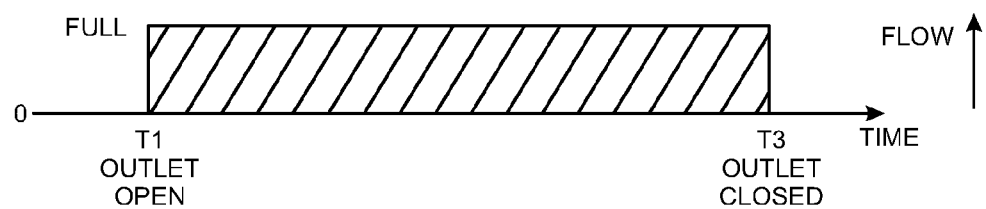
Figure 5:
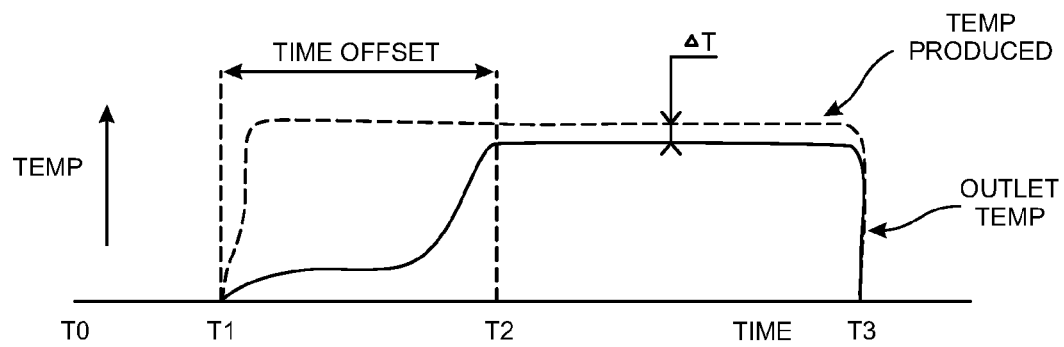

FIG. 5 illustrates schematically such a method of configuring a hot-water supply installation having a plurality of controllable hot-water outlets—for example a plurality of taps, and one or more shower outlets, e.g. as described with reference to FIG. 4. In order to improve the efficiency of energy usage in an installation, a processor of the system is used in conjunction with a portable temperature sensor 800 that is placed beneath each of the outlets in turn (although clearly more than one sensor may be used, rather than the same one being used for every outlet).

An installer may have an app on a smart phone, for example, or some other wireless transmission/reception unit (WTRU) that is able to receive an instruction from the processor that tells the installer to open the relevant tap, and preferably to open it to its maximum opening as quickly as possible.

Thus, as shown in the plot of flow against time in FIG. 5, there is an initial lag (time T0 to T1), due to the reaction time of the installer, before flow through the outlet and through the hot water system (as only one outlet at a time is opened) goes from zero to a maximum at T1 (the maximum possibly being different and unique to each outlet of the hot water system). Or the installer may use the WTRU, or more typically an app on the WTRU, to inform the processor that an agreed/identified tap is being opened now.

In either event, the processor also receives information from a temperature sensor 409 at the outlet 407 of the source of hot-water 405 with an outlet having a controllable outflow temperature. The portable temperature sensor 800 also preferably includes an internal clock (preferably synchronised to the system time of the processor) and an RF (e.g., Wi-Fi, Bluetooth, or IMS) capability for communicating time and temperature information to the remote processor 440. The temperature against time plot of FIG. 2 shows how the temperature sensed by portable sensor 800 initially remains low, and then climbs to reach a stable maximum at time T2, some time after time T1. It can also be seen that the maximum detected temperature sensed by portable sensor 800 (from time T1 to T3) is lower, by $\Delta T$, than the temperature at the outlet 407 of the source of hot water having a controllable outflow temperature.

It will be appreciated that the temperature sensor 800 may be configured in such a way that the data that it gathers (time vs temperature) is only provided to the system processor 440 after the event—i.e., by a wired download process or using NFC, but this will generally be less satisfactory than providing direct RF communication as already described.

The foregoing description of the method of configuring a hot water supply system, and of controlling the temperature of water delivered from a hot water supply installation was deliberately kept simple for ease of application, but it should be appreciated that these methods apply equally to installations that include a PCM energy storage arrangement and a "green" heat source such as a heat pump.

Referring back to FIG. 3, instead of or in addition to providing one or more status sensors 24 to measure pressure within the enclosure, other sensor types can be provided to measure optical properties, such as transparency, absorption, refraction, refractive index, of the PCM, because various of these change with phase transitions in the PCM. In addition, various of these properties may exhibit a wavelength dependence that changes with a change of phase.

The energy bank may therefore further comprise one or more optical sources to launch light into the phase change material, and the one or more status sensors 24 may include an optical sensing arrangement to detect light launched from the optical source (s) after the light has passed through the phase change material. The change between phases in the phase change material gives rise to reversible changes in optical properties of the phase change material, and hence observing optical properties of the PCM can be used to glean information about the state of the PCM. Preferably, optical properties of the PCM are observed in several areas of the PCM, and preferably in different directions within the material. For example, optical sources and sensors may be arranged so that light from the source(s) passes lengthwise through the PCM at one or more positions, and other source(s) and sensor(s) may be arranged so that light from the source(s) passes width wise through the PCM at one or more positions and in one or more orientations (through the width and or through the thickness).

The optical source(s) may be controllable to produce light of different colours and the optical sensing arrangement(s) may be configured to detect at least some of different colours. By selecting appropriate colours of light, based on the particular PCM chosen for any application, it may be possible to determine more accurately the extent to which the phase of the PCM has changed.

Preferably the optical source comprises a plurality of separately activatable devices.

Coupling the optical sensing arrangement to a processor which is configured to estimate an amount of energy stored in the phase change material based on information received from the optical sensing arrangement provides a means of determining the amount of energy stored as latent heat within the PCM, and this information can be used in controlling the heat pump. In particular, such information may make possible more efficient and appropriate use of the heat pump in charging the PCM energy bank.

As a further option, the one or more status sensors 24 to provide measurement data indicative of the amount of energy stored as latent heat in the phase change material may include an acoustic source configured to launch sound into the phase change material, and an acoustic sensing arrangement to detect sound launched from the acoustic source after the sound has passed through the phase change material. The change between phases in the phase change material gives rise to reversible changes in sound absorbing properties of the phase change material, and hence observing sonic properties of the PCM can be used to glean information about the state of the PCM. The acoustic source may be configured to produce ultrasound.

During the commissioning process that was described with reference to FIGS. 4 and 5, an engineer may also be asked by the processor/system controller 440 to define all hot water outlets (for e.g., tap, shower, bath, kitchen), or in other words to map the system. In this process, the system controller will ask the engineer to fully open each of the outlets (taps, shower outlets, etc.) in turn, closing each before opening the next, and will monitor the resulting water flows, by means of the relevant flow measurement device 410. During this process, the relevant flow measurement device 410 will measure water flow and the processor will receive these data and will add the results to a database. Based on this information, the system will subsequently be able to provide the most efficient flow into each single tap, by controlling the relevant flow control device 415, when any outlet is opened.

A method of mapping an in-building water supply installation according to an first aspect of the disclosure will now be described with reference to FIG. 4.

The method comprises opening a first of the plurality of controllable water outlets and processing signals from the at least one flow measurement device 410 with the processor 440 at least until a first flow characteristic is determined, and then closing the first of the plurality of controllable water outlets. The opening of the first of the plurality of controllable water outlets is preferably instructed by the processor or system controller 440 sending a message to the mobile device 450 carried by the relevant engineer. For example, the instruction may be sent by Wi-Fi and tell the engineer to open the hot bath tap 436 in the master bathroom 421. The engineer, carrying the mobile device 450, then goes to the master bathroom and opens the hot bath tap 436 fully. The mobile device may provide the engineer with a prompt, preferably audible and with a countdown, to tell the engineer when precisely to open the tap. Alternatively, the app on the mobile device may be configured to accept an input from the engineer, such as the pressing or release of a button, at the moment that the tap 436 is opened. In either case, the app may capture a local time for the prompt or the moment, and then send this local time, along with the identity of the relevant controllable outlet, to the system controller 440 or server 445. In this way, delays in the prompt reaching the mobile device 450 or of the timing of the instruction reaching the controller 440 or server 445 can be accounted for (the mobile device 450 and the system controller 440 preferably go through some handshaking procedure, either before or after the mapping process, so that wither offsets between the clocks of the two devices can be eliminated or they can also be accounted for).

The engineer may then work her way around the premises selecting an outlet identity from a list or menu on the app, or entering an unambiguous identifier, opening each of the outlets in turn. Or the system controller may already have been provided with a list of all the taps, etc. (generally "controllable outlets") and may prompt the engineer, by sending another message to the mobile device 450, to go to the relevant outlet. The app preferably includes the option for the engineer to send a message to the system controller 440/server 445, that she is in place and ready to receive an instruction to open the next controllable outlet. The process is then repeated for each of the other hot water outlets, until all the outlets and their flow characteristics-namely the lag before flow is detected, the rate of rise of flow, the maximum flow rate, and any other identifiable characteristics have been captured and stored in a database. By using the characteristics stored in the database, the processor 440 is then subsequently able to identify the opening of a particular one of the plurality of controllable water outlets based on the similarity of a detected flow characteristic to a respective flow characteristic.

The processor is also provided with some rules concerning preferred flow rates and, optionally, flow durations, based on the type of outlet (bath tap, kitchen tap, basin tap, cloakroom tap) and its location (main bathroom, en-suite, child's room, adult's room, cloakroom, kitchen, for example), and use these rules, along with the outlet identity recognised from the detected flow characteristics, to determine a target flow rate. The targeted flow rate is then imposed by the system controller 440 by controlling the relevant flow controller 415, and preferably monitored by the corresponding flow measurement device 410. In this way, by controlling at least one flow regulator, based on the identification of the relevant outlet, the processor 440 is able control a supply of water to the identified controllable water outlet.

Each of the respective flow characteristic may include a respective stable flow rate. The method may then further comprise configuring the processor 440 to control the at least one flow regulator 415 to impose at least a 10% cut in the flow rate to each of each of the plurality of controllable water outlets, based on the respective stable flow rate. Optionally, the method may further comprise configuring the processor 440 to control the at least one flow regulator 415 to impose at least a 10% cut in the flow rate, based on respective stable flow rate, to any of the plurality of controllable water outlets whose respective stable flow rate is greater than 7 litres per minute. This is of particular application for taps that serve basins in bathrooms, en suites, and most particularly cloakrooms, where taps are often largely used to provide water for handwashing-which can be achieved effectively with quite modest flow rates.

The above-described technique of mapping a hot water supply installation may be used to populate a database or train logic, such as a neural network or machine learning algorithm (MLA), which may be used by a processor associated with an energy bank as previously described, so that the processor is better able to identify a particular outlet or outlet type from detected flow behaviour and hence to more readily estimate a demand for hot water from a hot water supply. This in turn may improve the efficiency of controlling the heat pump and of using the energy bank.

The knowledge learned from the mapping process just described can of course be utilised in the disinfection process described with reference to FIG. 1, and in particular may be used to optimise disinfection times (e.g., flow durations) for each of the hot water outlets.

Having described an energy bank and the installation and operation of an energy bank in a hot water supply installation, we will now consider how the energy bank and heat pump may be integrated into both a hot water supply system and a space heating arrangement.

Figure 6:
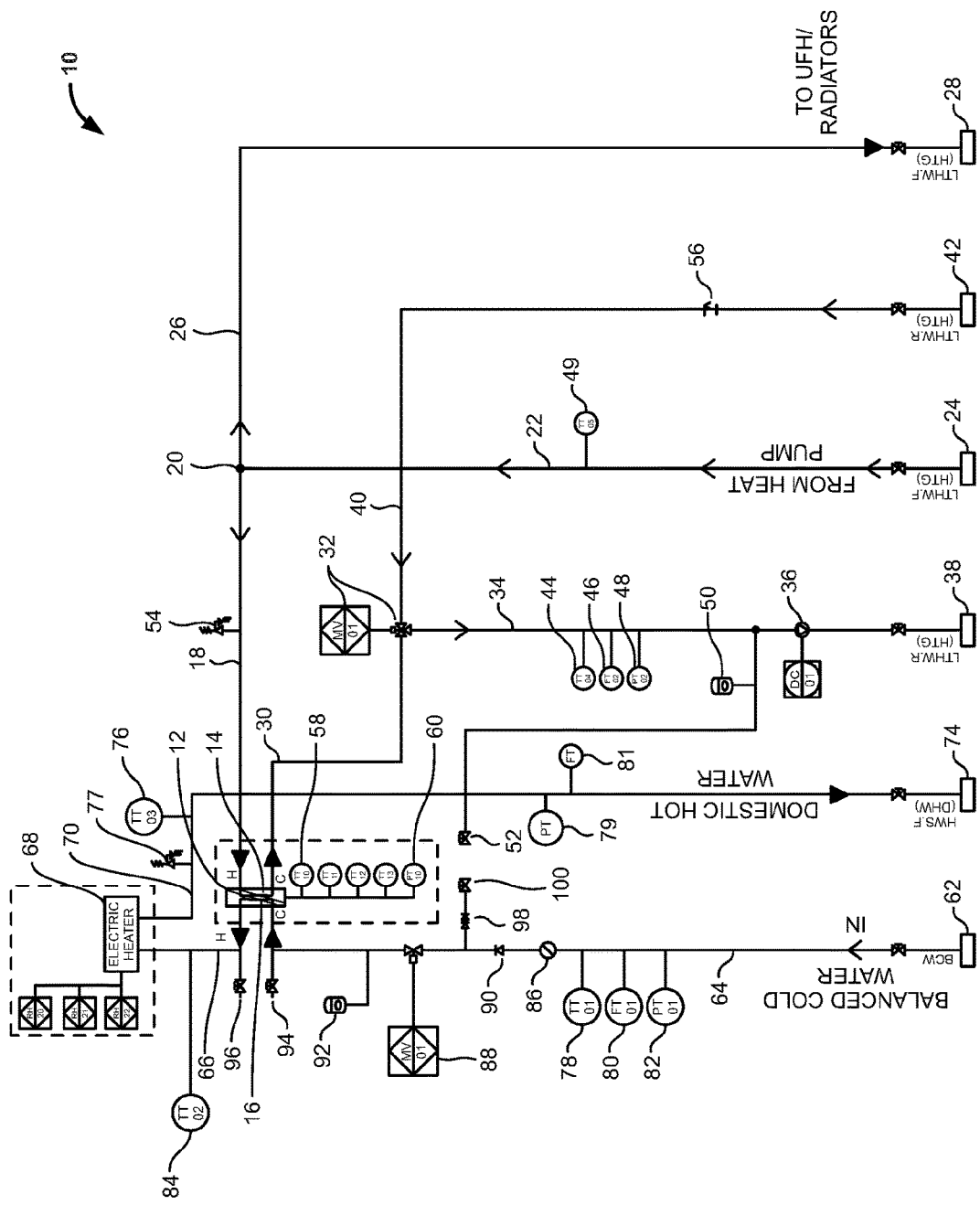
FIG. 6 is a schematic diagram showing a potential arrangement of components of an interface unit, incorporating energy bank according to an aspect of the disclosure.

FIG. 6 shows schematically a potential arrangement of components of an interface unit 10 according to an aspect of the disclosure. The interface unit interfaces between a heat pump (not shown in this Figure) and an in-building hot water system. The interface unit includes a heat exchanger 12 comprising an enclosure (not separately numbered) within which is an input-side circuit, shown in very simplified form as 14, for connection to the heat pump, and an output-side circuit, again shown in very simplified form as 16, for connection to the in-building hot water system (not shown in this Figure). The heat exchanger 12 also contains a thermal storage medium for the storage of energy, but this is not shown in the Figure. In the example that will now be described with reference to FIG. 6 the thermal storage medium is a phase-change material. It will be recognised that the interface unit corresponds to he previously described energy bank. Throughout this specification, including the claims, references to energy bank, thermal storage medium, energy storage medium and phase change material should be considered to be interchangeable unless the context clearly requires otherwise.

Typically, the phase-change material in the heat exchanger has an energy storage capacity (in terms of the amount of energy stored by virtue of the latent heat of fusion) of between 2 and 5 MJoules, although more energy storage is possible and can be useful. And of course, less energy storage is also possible, but in general one wants to maximise (subject to practical constraints based on physical dimensions, weight, cost and safety) the potential for energy storage in the phase-change material of the interface unit 10. More will be said about suitable phase-change materials and their properties, and also about dimensions etc. later in this specification.

The input side circuit 14 is connected to a pipe or conduit 18 which is in turn fed from node 20, from pipe 22 which has a coupling 24 for connection to a feed from a heat pump. Node 20 also feeds fluid from the heat pump to pipe 26 which terminates in a coupling 28 which is intended for connection to a heating network of a house or flat—for example for plumbing into underfloor heating or a network of radiators or both. Thus, once the interface unit 10 is fully installed and operational, fluid heated by a heat pump (which is located outside the house or flat) passes through coupling 24 and along pipe 22 to node 20, from where, depending upon the setting of 3-port valve 32, the fluid flow passes along pipe 18 to the input-side circuit 14 of the heat exchanger, or along pipe 26 and out through coupling 28 to the heating infrastructure of the house or flat.

Heated fluid from the heat pump flows through the input-side circuit 14 of the heat exchanger and out of the heat exchanger 12 along pipe 30. In use, under some circumstance, heat carried by the heated fluid from the heat pump gives up some of its energy to the phase change material inside the heat exchanger and some to water in the output-side circuit 16. Under other circumstances, as will be explained later, fluid flowing through the input-side circuit 14 of the heat exchanger actually acquires heat from the phase change material.

Pipe 30 feeds fluid that leaves the input-side circuit 14 to a motorized 3-port valve 32 and then, depending upon the status of the valve out along pipe 34 to pump 36. Pump 36 serves to push the flow on to the external heat pump via coupling 38.

The motorized 3-port valve 32 also receives fluid from pipe 40 which receives, via coupling 42, fluid returning from the heating infrastructure (e.g., radiators) of the house or flat.

Between the motorized 3-port valve 32 and the pump 36 a trio of transducers are provided: a temperature transducer 44, a flow transducer 46, and a pressure transducer 48. In addition, a temperature transducer 49 is provided in the pipe 22 which brings in fluid from the output of the heat pump. These transducers, like all the others in the interface unit 10, are operatively connected to or addressable by a processor, not shown, which is typically provided as part of the interface unit-but which can be provided in a separate module.

Although not illustrated in FIG. 6, an additional electrical heating element may also be provided in the flow path between the coupler 24, which receives fluid from the output of the heat pump. This additional electrical heating element may again be an inductive or resistive heating element and is provided as a means to compensate for potential failure of the heat pump, but also for possible use in adding energy to the thermal storage unit (for example based on the current energy cost and predicted for heating and/or hot water. The additional electrical heating element is also of course controllable by the processor of the system.

Also coupled to pipe 34 is an expansion vessel 50, to which is connected a valve 52 by means of which a filling loop may be connected to top up fluid in the heating circuit. Also shown as part of the heating circuit of the interface unit are a pressure relief valve 54, intermediate the node 20 and the input-side circuit 14, and a strainer 56 (to capture particulate contaminants) intermediate coupling 42 and the 3-port valve 32.

The heat exchanger 12 is also provided with several transducers, including at least one temperature transducer 58, although more (e.g. up to 4 or more) are preferable provided, as shown, and a pressure transducer 60. In the example shown, the heat exchanger includes 4 temperature transducers uniformly distributed within the phase change material so that temperature variations can be determined (and hence knowledge obtained about the state of the phase change material throughout its bulk). Such an arrangement may be of particular benefit during the design/implementation phase as a means to optimise design of the heat exchanger-including in optimising addition heat transfer arrangements. But such an arrangement may also continue to be of benefit in deployed systems as having multiple sensors can provide useful information to the processor and machine learning algorithms employed by the processor (either of just the interface unit, and/or of a processor of a system including the interface unit.

The arrangement of the cold-water feed and the hot water circuit of the interface unit 10 will now be described. A coupling 62 is provided for connection to a cold feed from a water main. Typically, before water from the water main reaches the interface unit 10, the water will have passed through an anti-syphon non-return valve and may have had its pressure reduced. From coupling 62 cold water passes along pipe to the output-side circuit 16 of the heat exchanger 12. Given that we provide a processor that is monitoring numerous sensors in the interface unit, the same processor can optionally be given one more task to do. That is to monitor the pressure at which cold water is delivered from the mains water supply. To this end, a further pressure sensor can be introduced in to the cold water supply line upstream of coupling 62, and in particular upstream of any pressure reducing arrangement within the premises. The processor can then continually or periodically monitor the supplied water pressure, and even prompt the owner/user to seek compensation from the water supply company if the water main supplies water at a pressure below the statutory minimum.

From the output-side circuit 16 water, which may have been heated by its passage through the heat exchanger, passes along a pipe 66 to an electrical heating unit 68. The electrical heating unit 68, which is under the control of the processor mentioned previously, may comprise a resistive or inductive heating arrangement whose heat output can be modulated in accordance with instructions from the processor.

The processor is configured to control the electrical heater, based on information about the status of the phase-change material and of the heat pump.

Typically, the electrical heating unit 68 has a power rating of no more than 10 kW, although under some circumstances a more powerful heater, e.g. 12 kW, may be provided.

From the electric heater 68, what will by now hot water passes along a pipe 70 to a coupling 74 to which the hot water circuit, including controllable outlets such as taps and showers, of the house or flat will be connected.

A temperature transducer 76 is provided after the electric heater 68, for example at the outlet of the electric heater 68 to provide information on the water temperature at the outlet of the hot water system. A pressure relief valve 77 is also provided in the hot water supply, and while this is shown as being located between the electric heater 68 and the outlet temperature transducer 76, its precise location is unimportant—as indeed is the case for many of the components illustrated in FIG. 6.

Also somewhere in the hot water supply line is a pressure transducer 79 and or a flow transducer 81 either of which can be used by the processor to detect a call for hot water—i.e. detect the opening of a controllable outlet such as a tap or shower. The flow transducer is preferably one which is free from moving parts, for example based on sonic flow detection or magnetic flow detection. The processor can then use information from one or both of these transducers, along with its stored logic, to decide whether to signal to the heat pump to start.

It will be appreciated that the processor can call on the heat pump to start either based on demand for space heating (e.g. based on a stored program either in the processor or in an external controller, and/or based on signals from one or more thermostats—e.g. room stats, external stats, underfloor heating stats) or demand for hot water. Control of the heat pump may be in the form of simple on/off commands but may also or alternatively be in the form of modulation (using, for example, a ModBus).

As is the case with the heating circuit of the interface unit, a trio of transducers are provided along the cold-water feed pipe 64: a temperature transducer 78, a flow transducer 80, and a pressure transducer 82. Another temperature transducer 84 is also provided in pipe 66 intermediate the outlet of the output-side circuit 16 of the heat exchanger 12 and the electric heater 68. These transducers are again all operatively connected to or addressable by the processor mentioned previously.

Also shown on the cold water supply line 64 are a magnetic or electrical water conditioner 86, a motorised and modulatable valve 88 (which like all the motorised valves may be controlled by the processor mentioned previously), a non-return valve 90, and an expansion vessel 92. The modulatable valve 88 can be controlled to regulate the flow of cold water to maintain a desired temperature of hot water (measured for example by temperature transducer 76).

Valves 94 and 96 are also provided for connection to external storage tanks for the storage of cold and heated water respectively. Finally, a double check valve 98 connects cold feed pipe 64 to another valve 100 which can be used with a filling loop to connect to previously mentioned valve 52 for charging the heating circuit with more water or a mix of water and corrosion inhibiter.

It should be noted that FIG. 6 shows various of the pipes crossing, but unless these crossing are shown as nodes, like node 20, the two pipes that are shown as cross do not communicate with each other, as should by now be clear from the foregoing description of the Figure.

Although not shown in FIG. 6, the heat exchanger 12 may include one or more additional electrical heating elements configured to put heat into the thermal storage medium. While this may seem counter intuitive, it permits the use of electrical energy to pre-charge the thermal storage medium at times when it makes economic sense to do so, as will now be explained.

It has long been the practice of energy supply companies to have tariffs where the cost of a unit of electricity varies according to the time of day, to take account of times of increased or reduced demand and to help shape customer behaviour to better balance demand to supply capacity. Historically, tariff plans were rather coarse reflecting the technology both of power generation and of consumption. But increasing incorporation of renewable energy sources of electrical power—such as solar power (e.g. from photovoltaic cells, panels, and farms) and wind power, into the power generation fabric of countries has spurred the development of a more dynamic pricing of energy. This approach reflects the variability inherent in such weather-dependent power generation. Initially such dynamic pricing was largely restricted to large scale users, increasingly dynamic pricing is being offered to domestic consumers.

The degree of dynamism of the pricing varies from country to country, and also between different producers within a given country. At one extreme, "dynamic" pricing is little more than the offering of different tariffs in different time windows over the day, and such tariffs may apply for weeks, months, or seasons without variation. But some dynamic pricing regimes enable the supplier to change prices with a day's notice or less—so for example, customers may be offered today prices for half-hour slots tomorrow. Time slots of as short as 6 minutes are offered in some countries, and conceivably the lead time for notifying consumers of forthcoming tariffs can be reduced further by including "intelligence" in energy-consuming equipment.

Because it is possible to use short and medium term weather predictions to predict both the amount of energy likely to be produced by solar and wind installations, and the likely scale of power demand for heating and cooling, it becomes possible to predict periods of extremes of demand. Some power generation companies with significant renewable generation capacity have even been known to offer negative charging for electricity—literally paying customers to use the excess power. More often, power may be offered at a small fraction of the usual rate.

By incorporating an electric heater into an energy storage unit, such as a heat exchanger of systems according to the disclosure, it becomes possible for consumers to take advantage of periods of low-cost supply and to reduce their reliance on electrical power at times of high energy prices. This not only benefits the individual consumer, but it is also beneficial more generally as it can reduce demand at times when excess demand must be met by burning fossil fuels.

The processor of the interface unit has a wired or wireless connection (or both) to a data network, such as the Internet, to enable the processor to receive dynamic pricing information from energy suppliers. The processor also preferably has a data link connection (e.g. a ModBus) to the heat pump, both to send instructions to the heat pump and to receive information (e.g. status information and temperature information) from the heat pump. The processor has logic which enables it* to learn the behaviour of the household, and with this and the dynamic pricing information, the processor is able to determine whether and when to use cheaper electricity to pre-charge the heating system. This may be by heating the energy storage medium using an electrical element inside the heat exchanger, but alternatively this can be by driving the heat pump to a higher-than-normal temperature—for example 60 Celsius rather than between 40 and 48 Celsius. The efficiency of the heat pump reduces when it operates at higher temperature, but this can be taken into account by the processor in deciding when and how best to use cheaper electricity.

*Because the system processor is connectable to a data network, such as the Internet and/or a provider's intranet, the local system processor can benefit from external computing power. So, for example the manufacturer of the interface unit is likely to have a cloud presence (or intranet) where computing power is provided for calculations of, for example, predicted: occupancy; activity;

tariff (short/long); weather forecasts (which may be preferable to generally available weather forecasts because they can be pre-processed for easy use by the local processor, and they may also be tailored very specifically to the situation, location, exposure of the property within which the interface unit is installed); identification of false positives and/or false negatives.

To protect users from the risk of scalding by overheated water from the hot water supply system it is sensible to provide a scalding protection feature. This may take the form of providing an electrically controllable (modulatable) valve to mix cold water from the cold water supply into hot water as it leaves the output circuit of the heat exchanger (the extra valve can be mounted between the nodes to which existing valves 94 and 96 previously mentioned).

FIG. 6 shows schematically what might be considered the "guts" of the interface unit but does not show any container for these "guts". An important application of interface units according to the disclosure is as a means to enable a heat pump to be used as a practical contributor to the space heating and hot water requirements of a dwelling that was previously provide with a gas-fired combination boiler (or which might otherwise have such a boiler installed), it will be appreciated that it will often be convenient both to provide a container both for aesthetics and safety, just as is the case conventionally with combi boilers. Moreover, preferably any such container will be dimensioned to fit within a form factor enabling direct replacement of a combi boiler-which are typically wall mounted, often in a kitchen where they co-exist with kitchen cabinets. Based on the form of a generally rectangular cuboid (although of course, for aesthetics, ergonomics, or safety, curved surfaces may be used for any or all of the surfaces of the container) with a height, width and depth, suitable sizes may be found in the approximate ranges: height 650 mm to 800 mm; width 350 mm to 550 mm; depth 260 mm to 420 mm; for example 800 mm high, by 500 mm wide, and 400 mm deep, although larger, and in particular taller, units may be provided for use in situations where they can be accommodated.

One notable distinction of interface units according to the disclosure with respect to gas combi boilers is that while the containers of the latter generally have to be made of non-combustible materials-such as steel, due to the presence of a hot combustion chamber, the internal temperatures of an interface unit will normally be considerably less than 100 Celsius, typically less than 70 Celsius, and generally less than 60 Celsius. So, it becomes practical to use flammable materials such a wood, bamboo, or even paper, in fabricating a container for the interface unit.

The lack of combustion also opens up the possibility to install interface units in locations that would generally never be considered as suitable for the installation of gas combi boilers—and of course, unlike a gas combi boiler, interface units according to the disclosure, do not require a flue for exhaust gases. So, for example, it becomes possible to configure an interface unit for installation beneath a kitchen worktop, and even to make use of the notorious dead spot represented by an under-counter corner. For installation in such a location the interface unit could actually be integrated into an under-counter cupboard—preferably through a collaboration with a manufacturer of kitchen cabinets. But greatest flexibility for deployment would be retained by having an interface unit that effectively sits behind some form of cabinet, the cabinet being configured to allow access to the interface unit. The interface unit would then preferably be configured to permit the circulation pump 36 to be slid out and away from the heat exchanger 12 before the circulation pump 36 is decoupled from the flow path of the input-side circuit.

Consideration can also be given to taking advantage of other space frequently wasted in fitted kitchens, namely the space beneath under-counter cupboards. There is often more a space with a height of more than 150 mm, and a depth of around 600 mm, with widths of 300, 400, 500, 600 mm or more (although allowance needs to be made for any legs supporting the cabinets). For new installations in particular, or where a combi boiler is being replaced along with a kitchen refit, it makes sense to use these spaces at least to accommodate the heat exchanger of the interface unit—or to use more than one heat exchanger unit for a given interface unit.

Particularly for interface units designed for wall mounting, although potentially beneficial whatever the application of the interface unit, it will often be desirable to design the interface unit as a plurality of modules. With such designs it can be convenient to have the heat exchanger as one of the of modules, because the presence of the phase-change material can result in the heat exchanger alone weighing more than 25 kg. For reasons of health and safety, and in order to facilitate one-person installation, it would be desirable to ensure that an interface unit can be delivered as a set of modules none of which weighs more than about 25 kg.

Such a weight constraint can be supported by making one of the modules a chassis for mounting the interface unit to a structure. For example, where an interface unit is to be wall mounted in place of an existing gas combi boiler, it can be convenient if a chassis, by which the other modules are supported, can first be fixed to the wall. Preferably the chassis is designed to work with the positions of existing fixing points used to support the combi boiler that is being replaced. This could potentially be done by providing a "universal" chassis that has fixing holes preformed according to the spacings and positions of popular gas combi boilers. Alternatively, it could be cost effective to produce a range of chassis each having hole positions/sizes/spacings to match those of particular manufacturer's boilers. Then one just needs to specify the right chassis to replace the relevant manufacturer's boiler. There are multiple benefits to this approach: it avoids the need to drill more holes for plugs to take fixing bolts—and not only does this eliminate the time needed to mark out, drill the holes and clean up, but it avoids the need to further weaken the structure of the dwelling where installation is taking place—which can be an important consideration given the low cost construction techniques and materials frequently used in "starter homes" and other low cost housing.

Preferably the heat exchanger module and the chassis module are configured to couple together. In this way it may be possible to avoid the need for separable fastenings, again saving installation time.

Preferably an additional module includes first interconnects, e.g. 62 and 74, to couple the output side circuit 16 of the heat exchanger 12 to the in-building hot water system. Preferably the additional module also includes second interconnects, e.g. 38 and 24, to couple the input side circuit 14 of the heat exchanger 12 to the heat pump. Preferably the additional module also includes third interconnects, e.g. 42 and 28, to couple the interface unit to the heat circuit of the premises where the interface unit is to be used. It will be appreciated that by mounting heat exchanger to the chassis, which is itself directly connected to the wall, rather than first mounting the connections to the chassis, the weight of the heat exchanger is kept closer to the wall, reducing the cantilever loading effect on the wall fixings that secure the interface unit to the wall.

Phase Change Materials

One suitable class of phase change materials are paraffin waxes which have a solid-liquid phase change at temperatures of interest for domestic hot water supplies and for use in combination with heat pumps. Of particular interest are paraffin waxes that melt at temperatures in the range 40 to 60 Celsius, and within this range waxes can be found that melt at different temperatures to suit specific applications. Typical latent heat capacity is between about 180 KJ/kg and 230KJ/kg and a specific heat of perhaps 2.27 $Jg^{-1}K^{-1}$ in the liquid phase, and 2.1 $Jg^{-1}K^{-1}$ in the solid phase. It can be seen that very considerable amounts of energy can be stored taking using the latent heat of fusion. More energy can also be stored by heating the phase change liquid above its melting point. For example, when electricity costs are relatively low and it can be predicted that there will shortly be a need for hot water (at a time when electricity is likely to, or known to be going to, cost more perhaps), then it can make sense to run the heat pump at a higher-than-normal temperature to "overheat" the thermal energy store.

A suitable choice of wax may be one with a melting point at around 48 Celsius, such as n-tricosane $C_{23}$, or paraffin $C_{20}$-$C_{33}$. Applying the standard 3K temperature difference across the heat exchanger (between the liquid supplied by the heat pump and the phase change material in the heat exchanger) gives a heat pump liquid temperature of around 51 Celsius. And similarly on the output side, allowing a 3K temperature drop, we arrive at a water temperature of 45 Celsius which is satisfactory for general domestic hot water-hot enough for kitchen taps, but potentially a little high for shower/bathroom taps-but obviously cold water can always be added to a flow to reduce water temperature. Of course, if the household are trained to accept lower hot water temperatures, or if they are acceptable for some other reason, then potentially a phase change material with a lower melting point may be considered, but generally a phase transition temperature in the range 45 to 50 is likely to be a good choice. Obviously, we will want to take into account the risk of *Legionella* from storing water at such a temperature, and the previously described disinfection techniques provide a means by which this risk may be managed.

Heat pumps (for example ground source or air source heat pumps) have operating temperatures of up to 60 Celsius (although by using propane as a refrigerant, operating temperatures of up to 72 Celsius are possible), but their efficiencies tend to be much higher when run at temperatures in the range of 45 to 50 Celsius. So, our 51 Celsius, from a phase transition temperature of 48 Celsius is likely to be satisfactory.

Consideration also needs to be given to the temperature performance of the heat pump. Generally, the maximum AT (the difference between the input and output temperature of the fluid heated by the heat pump) is preferably kept in the range of 5 to 7 Celsius, although it can be as high as 10 Celsius.

Although paraffin waxes are a preferred material for use as the energy storage medium, they are not the only suitable materials. Salt hydrates are also suitable for latent heat energy storage systems such as the present ones. Salt hydrates in this context are mixtures of inorganic salts and water, with the phase change involving the loss of all or much of their water. At the phase transition, the hydrate crystals are divided into anhydrous (or less aqueous) salt and water. Advantages of salt hydrates are that they have much higher thermal conductivities than paraffin waxes (between 2 to 5 times higher), and a much smaller volume change with phase transition. A suitable salt hydrate for the current application is $Na_2S_2O_3 \cdot 5H_2O$, which has a melting point around 48 to 49 Celsius, and latent heat of 200/220 KJ/kg.

In terms simply of energy storage, consideration can also be given to using PCMs with phase transition temperatures that are significantly above the 40-50 Celsius range. For example, a paraffin wax, waxes being available with a wide range of melting points:

n-henicosane $C_{24}$ which has a melting point around 40 Celsius;

n-docosane $C_{21}$ which has a melting point around 44.5 Celsius;

n-tetracosane $C_{23}$ which has a melting point around 52 Celsius;

n-pentacosane $C_{25}$ which has a melting point around 54 Celsius;

n-hexacosane $C_{26}$ which has a melting point around 56.5 Celsius;

n-heptacosane $C_{27}$ which has a melting point around 59 Celsius;

n-octacosane $C_{28}$ which has a melting point around 64.5 Celsius;

n-nonacosane $C_{29}$ which has a melting point around 65 Celsius;

n-triacosane $C_{30}$ which has a melting point around 66 Celsius;

n-hentriacosane $C_{31}$ which has a melting point around 67 Celsius;

n-dotriacosane $C_{32}$ which has a melting point around 69 Celsius;

n-triatriacosane $C_{33}$ which has a melting point around 71 Celsius;

paraffin $C_{22}$-$C_{45}$ which has a melting point around 58 to 60 Celsius;

paraffin $C_{21}$-$C_{50}$ which has a melting point around 66 to 68 Celsius; RT 70 HC which has a melting point around 69 to 71 Celsius.

Alternatively, a salt hydrate such as $CH_3COONa \cdot 3H_2O$—which has a melting point around 58 Celsius, and latent heat of 226/265 KJ/kg may be used.

Thus far, the thermal energy store has largely been described as having a single mass of phase change material within a heat exchanger that has input and output circuits each in the form of one or more coils or loops. But it may also be beneficial in terms of rate of heat transfer for example, to encapsulate the phase change material in a plurality of sealed bodies—for example in metal (e.g. copper or copper alloy) cylinders (or other elongate forms)-which are surrounded by a heat transfer liquid from which the output circuit (which is preferably used to provide hot water for a (domestic) hot water system) extracts heat.

With such a configuration the heat transfer liquid may either be sealed in the heat exchanger or, more preferably, the heat transfer liquid may flow through the energy store and may be the heat transfer liquid that transfers heat from the green energy source (e.g. a heat pump) without the use of an input heat transfer coil in the energy store. In this way, the input circuit may be provided simply by one (or more generally multiple) inlets and one or more outlets, so that heat transfer liquid passes freely through the heat exchanger, without being confined by a coil or other regular conduit, the heat transfer liquid transferring heat to or from the encapsulated PCM and then on to the output circuit (and thus to water in the output circuit). In this way, the input circuit is defined by the one or more inlets and the one or more out for the heat transfer liquid, and the freeform path(s) past the encapsulated PCM and through the energy store.

Preferably the PCM is encapsulated in multiple elongate closed-ended pipes arranged in one or more spaced arrangements (such as staggered rows of pipes, each row comprising a plurality of spaced apart pipes) with the heat transfer fluid preferably arranged to flow laterally (or transverse to the length of the pipe or other encapsulating enclosure) over the pipes-either on route from the inlets to the outlets or, if an input coil is used, as directed by one or more impellers provided within the thermal energy store.

Optionally, the output circuit may be arranged to be at the top of the energy store and positioned over and above the encapsulated PCM—the containers of which may be disposed horizontally and either above an input loop or coil (so that convection supports energy transfer upwards through the energy store) or with inlets direction incoming heat transfer liquid against the encapsulated PCM and optionally towards the output circuit above. If one or more impellers is used, preferably the or each impeller is magnetically coupled to an externally mounted motor-so that the integrity of the enclosure of the energy store is not compromised.

Optionally the PCM may be encapsulated in elongate tubes, typically of circular cross section, with nominal external diameters in the range of 20 to 67 mm, for example 22 mm, 28 mm, 35 mm, 42 mm, 54 mm, or 67 mm, and typically these tubes will be formed of a copper suitable for plumbing use. Preferably, the pipes are between 22 mm and 54 mm, for example between 28 mm and 42 mm external diameter.

The heat transfer liquid is preferably water or a water-based liquid such as water mixed with one or more of a flow additive, a corrosion inhibitor, an anti-freeze, a biocide,—and may for example comprise an inhibitor of the type designed for use in central heating systems—such as Sentinel X100 or Fernox F1 (both RTM)—suitably diluted in water.

Thus, throughout the description and claims of the present application the expression input circuit should be construed, unless the context clearly requires otherwise, to include an arrangement as just described and in which the path of liquid flow from the input of the input circuit to its output is not defined by a regular conduit but rather involves the liquid flowing substantially freely within the enclosure of the energy store.

The PCM may be encapsulated in a plurality of elongate cylinders of circular or generally circular cross section, the cylinders preferably being arranged spaced apart in one or more rows. Preferably the cylinders in adjacent rows are offset with respect to each other to facilitate heat transfer from and to the heat transfer liquid. Optionally an input arrangement is provided in which heat transfer liquid is introduced to the space about the encapsulating bodies by one or more input ports which may be in the form of a plurality of input nozzles, that direct the input heat transfer liquid towards and onto the encapsulating bodies fed by an input manifold. The bores of the nozzles at their outputs may be generally circular in section or may be elongate to produce a jet or stream of liquid that more effectively transfers heat to the encapsulated PCM. The manifold may be fed from a single end or from opposed ends with a view to increasing the flow rate and reducing pressure loss.

The heat transfer liquid may be pumped into the energy store 12 as the result of action of a pump of the green energy source (e.g. a heat pump or solar hot water system), or of another system pump, or the thermal energy store may include its own pump. After emerging from the energy store at one or more outlets of the input circuit the heat transfer liquid may pass directly back to the energy source (e.g. the heat pump) or may be switchable, through the use of one or more valves, to pass first to a heating installation (e.g. underfloor heating, radiators, or some other form of space heating) before returning to the green energy source.

The encapsulating bodies may be disposed horizontally with the coil of the output circuit positioned above and over the encapsulating bodies. It will be appreciated that this is merely one of many possible arrangements and orientations. The same arrangement could equally well be positioned with the encapsulating bodies arranged vertically.

Alternatively an energy store using PCM encapsulation may again use cylindrical elongate encapsulation bodies such as those previously described, but in this case with an input circuit in the form of conduit for example in the form of a coil. The encapsulation bodies may be arranged with their long axes disposed vertically, and the input 14 and output 18 coils disposed to either side of the energy store 12. But again this arrangement could also be used in an alternative orientation, such as with the input circuit at the bottom and the output circuit at the top, and the encapsulation bodies with their long axes disposed horizontally. Preferably one or more impellers are arranged within the energy store 12 to propel energy transfer liquid from around the input coil 14 towards the encapsulation bodies. The or each impeller is preferably coupled via a magnetic drive system to an externally mounted drive unit (for example an electric motor) so that the enclosure of the energy store 12 does not need to be perforated to accept a drive shaft-thereby reducing the risk of leaks where such shafts enter the enclosure.

By virtue of the fact that the PCM is encapsulated it becomes readily possible to construct an energy store that uses more than one phase change material for energy storage, and in particular permits the creation of an energy storage unit in which PCMs with different transition (e.g. melting) temperatures can be combined thereby extending the operating temperature of the energy store.

It will be appreciated that in embodiments of the type just described the energy store 12 contains one or more phase change materials to store energy as latent heat in combination with a heat transfer liquid (such as water or a water/inhibitor solution).

A plurality of resilient bodies that are configured to reduce in volume in response to an increase in pressure caused by a phase change of the phase change material and to expand again in response to a reduction in pressure caused by a reverse phase change of the phase change material are preferably provided with the phase change material within the encapsulation bodies (they may also be used in energy banks using "bulk" PCMs as described elsewhere in this specification.

According to a further aspect, the present disclosure provides a method of configuring a hot-water supply installation having a plurality of controllable hot-water outlets, the installation including:
a source of hot water with an outlet having a controllable outflow temperature; in a hot-water flow path between the outlet of the source of hot water and the plurality of controllable hot-water outlets, a flow measurement device and at least one flow regulator; a first temperature sensor to detect the outflow temperature; a processor operatively connected to the flow measurement device, the first temperature sensor, and the at least one flow regulator; the method comprising: placing an outlet temperature sensor in an outflow path for a first of the controllable hot water outlets; opening the first of the controllable hot-water outlets, so that water from the first of the controllable hot-water outlets impinges on the outlet temperature sensor; generating data by monitoring, using the outlet temperature sensor, a variation with respect to time, of the temperature of water from the first of the controllable hot water outlets; supplying the data to the processor; processing, using the processor, timing information about the time of the opening of the first of the controllable hot-water outlets, the data, and information from the first temperature sensor, to determine first parameters to control the outflow temperature of the source of hot-water, and optionally to control the at least one flow regulator, for use when the processor subsequently detects operation of the first of the controllable hot-water outlets.

This method may further comprise generating corresponding data for a second of the plurality of controllable hot-water outlets by placing an outlet temperature sensor in an outflow path for the second of the controllable hot water outlets; opening the second of the controllable hot-water outlets so that water from the second of the controllable hot-water outlets falls on the outlet temperature sensor; generating second data by monitoring, using the outlet temperature sensor, a variation with respect to time, of the temperature of water from the second of the controllable hot water outlets;

supplying the second data to the processor; processing, using the processor, timing information about the time of the opening of the second of the controllable hot-water outlets, the second data, and information from the first temperature sensor, to determine second parameters to control the outflow temperature of the source of hot-water for use when the processor subsequently detects operation of the second of the controllable hot-water outlets.

The present application contains a number of self-evidently inter-related aspects and embodiments, generally based around a common set of problems, even if many aspects do have broader applicability. In particular the logic and control methods, whilst not necessarily limited to operating with the hardware disclosed and may be more broadly applied, are all particularly suited to working with the hardware of the various hardware aspects and the preferred variants thereof. It will be appreciated by the skilled person that certain aspects relate to specific instances of other features and the preferred features described or claimed in particular aspects may be applied to others. The disclosure would become unmanageably long if explicit mention were made at every point of the inter-operability and the skilled person is expected to appreciate, and is hereby explicitly instructed to appreciate, that preferred features of any aspect may be applied to any other unless otherwise explicitly stated otherwise or manifestly inappropriate from the context. Again, for the sake of avoiding repetition, many aspects and concepts may be described only in method form or in hardware form but the corresponding apparatus or computer program or logic is also to be taken as disclosed in the case of a method or the method of operating the hardware in the case of an apparatus discussion. For an example of what is meant by the above, there are a number of features of both hardware and software relating to the combination of a fluid based (typically air source) heat pump and a phase change material and an electric supplementary heating element and control by a processor (within the unit or remote or both). Although this is the preferred application, most methods and hardware are more generally applicable to other heat pumps (thermoelectric and ground source) and to other renewable energy sources (a pump for a solar array for example) and to alternative supplementary heating (including the less preferred arrangement of a combustion heater such as a gas boiler, or even a less efficient higher temperature lower COP heat pump) and alternative thermal storage, including multi-temperature thermal storage arrays. Moreover, aspects which give particular arrangements for any of the components or their interaction can be used freely with aspects which focus on alternative elements of the system.

The invention claimed is:

1. A computer-controlled method of disinfecting a hot water supply system having a plurality of controllable hot water outlets, a water heating arrangement including an energy storage comprising an energy storage medium to store thermal energy, and a system controller comprising a processor, the method being performed by the processor and comprising:

providing to an operator a signal indicative of a future disinfection event;

receiving a response from the operator confirming that the future disinfection event is to be performed; and in response to receiving the response from the operator:
increasing a hot water supply temperature from a pre-event temperature of less than 60 Celsius to a disinfection temperature;
providing a signal to the operator to cause the operator to open a first controllable hot water outlet of the plurality of controllable hot water outlets;
providing a signal to the operator to close the first controllable hot water outlet after a first disinfection period;
providing a signal to the operator to open a second controllable hot water outlet of the plurality of controllable hot water outlets;
providing a signal to the operator to close the second controllable hot water outlet after a second disinfection period;
repeating each of the steps of providing a signal to the operator to open and then, after a third disinfection period, to close all of the plurality of controllable hot water outlets other than the first and second controllable hot water outlets;
reducing the hot water supply temperature to the pre-event temperature of less than 60 Celsius from the disinfection temperature; and
indicating to the operator the completion of the disinfection event.

2. The computer-controlled method of claim 1, wherein the signal indicative of the future disinfection event and each of the signals to the operator to open and close the plurality of controllable hot water outlets are provided to the operator by an app on a wireless transmission/reception unit (WTRU).

3. The computer-controlled method of claim 1, wherein increasing the hot water supply temperature from the pre-event temperature of less than 60 Celsius to the disinfection temperature comprises increasing a temperature of the energy storage medium in the energy storage.

4. The computer-controlled method of claim 3, wherein increasing the temperature of the energy storage medium in the energy storage involves supplying heat from an electrical heating arrangement associated with the energy storage, or from a heat pump or from a solar-powered water heater.

5. The computer-controlled method of claim 1, wherein increasing the hot water supply temperature from the pre-event temperature of less than 60 Celsius to the disinfection temperature comprises applying heat to water in a supply line intermediate the energy storage and the plurality of controllable hot water outlets.

6. The computer-controlled method of claim 1, wherein the providing of each of the signals to the operator is controlled so that the operator is guided to open the plurality of controllable hot water outlets in sequence starting from one of the plurality of controllable hot water outlets that has the shortest flow path distance from the energy storage.

7. The computer-controlled method of claim 1, wherein water heated by the energy storage is supplied to the plurality of controllable hot water outlets by one or more branched supply lines, and the providing of each of the signals to the operator is controlled so that the operator is guided to open the plurality of controllable hot water outlets in sequence along a supply line branch starting from one of the plurality of controllable hot water outlets on the branch that has the shortest flow path distance from the energy storage.

8. The computer-controlled method of claim 1, wherein the first, second, and third disinfection periods are substantially the same, or wherein each of the first, second, and third disinfection periods is selected based, at least in part, on a flow path distance from the energy storage to a respective one of the plurality of controllable hot water outlets.

9. The computer-controlled method of claim 1, further comprising scheduling a disinfection event.

10. The computer-controlled method of claim 9, wherein the future disinfection event is a scheduled disinfection event that is scheduled to take place within a predetermined time.

11. The computer-controlled method of claim 1, further comprising inferring which of the plurality of controllable hot water outlets has provided a demand for heated water and setting a heating characteristic based thereon and a inferred transit path thereto.

12. The computer-controlled method of claim 1, wherein the pre-event temperature of less than 60 Celsius is a hot water supply temperature regulated by a controller of the hot water supply system.

13. A hot-water supply installation having a plurality of controllable hot water outlets, the hot-water supply installation including:
a source of hot water with an outlet having a controllable outflow temperature, the source including an energy storage arrangement containing a mass of energy storage medium to store thermal energy and a heat exchanger coupled to a heat pump or a solar-powered water heater, and a system controller configured to:
provide to an operator a signal indicative of a future disinfection event;
receive a response from the operator confirming that the future disinfection event is to be performed; and
in response to receiving the response from the operator:
increase a hot water supply temperature from a pre-event temperature of less than 60 Celsius to a disinfection temperature;
provide a signal to the operator to cause the operator to open a first controllable hot water outlet of the plurality of controllable hot water outlets;
provide a signal to the operator to close the first controllable hot water outlet after a first disinfection period;
provide a signal to the operator to open a second controllable hot water outlet of the plurality of controllable hot water outlets;
provide a signal to the operator to close the second controllable hot water outlet after a second disinfection period;
repeat the providing of each of the signals to the operator to open and then, after a third disinfection period, to close all of the plurality of controllable hot water outlets other than the first and second controllable hot water outlets;
reduce the hot water supply temperature to the pre-event temperature of less than 60 Celsius from the disinfection temperature; and
indicate to the operator the completion of the future disinfection event.

14. The hot-water supply installation of claim 13, wherein the energy storage arrangement also comprises an electrical heating arrangement coupled to the system controller.

15. The hot-water supply installation of claim 13, wherein an additional heating arrangement is provided in a hot water flow path from the energy storage arrangement to the plurality of controllable hot water outlets, the additional heating arrangement being coupled to the system controller.

16. The hot-water supply installation of claim 13, wherein the system controller is configured to limit the controllable outflow temperature at which water is supplied from the outlet of the source of hot water to less than 60 Celsius except during disinfection events.

17. The hot-water supply installation of claim 13, wherein the system controller is coupled to a radio frequency transceiver for signalling to a wireless transmission/reception unit (WTRU) of an operator.

18. A method of supplying heated water by a hot water supply system to a water outlet from an appliance including a thermal energy storage, a renewable heat source and a supplementary heat source, the method comprising:
determining a demand for heated water at the water outlet;
in response to determining the demand for heated water at the water outlet, heating water to a first target temperature in a range of 40-50 degrees Celsius to provide heated water to a user;
detecting an elapsed period of time without substantial water usage; and
in response to detecting the elapsed period of time without substantial water usage, performing at least one of the following:
heating the water in a heat exchanger to a disinfection temperature of at least 60C; and/or
in response to the demand for heated water, initially heating the water leaving the appliance to a disinfection temperature for a period of time sufficient for a pulse of heated water to travel to the water outlet and thereafter reducing the temperature to the first target temperature.

19. The method according to claim 18 further comprising inferring the water outlet has provided the demand for heated water from a plurality of water outlets, and setting a heating characteristic based on the water outlet and an inferred transit path to the water outlet.

* * * * *